*US009363160B2*

(12) United States Patent
Sticker

(10) Patent No.: US 9,363,160 B2
(45) Date of Patent: Jun. 7, 2016

(54) SYSTEM AND METHOD FOR PROVISIONING AND MANAGING NETWORK ACCESS AND CONNECTIVITY

(75) Inventor: Harry Sticker, New York, NY (US)

(73) Assignee: HARRIS CORPORATION, Melbourne, FL (US)

( * ) Notice: Subject to any disclaimer, the term of this patent is extended or adjusted under 35 U.S.C. 154(b) by 1639 days.

(21) Appl. No.: 12/750,918

(22) Filed: Mar. 31, 2010

(65) Prior Publication Data

US 2010/0262446 A1 Oct. 14, 2010

Related U.S. Application Data

(60) Provisional application No. 61/165,122, filed on Mar. 31, 2009.

(51) Int. Cl.
*G06F 13/00* (2006.01)
*H04L 12/721* (2013.01)

(52) U.S. Cl.
CPC .............. *H04L 45/12* (2013.01); *H04L 45/124* (2013.01)

(58) Field of Classification Search
CPC .............. H04L 29/06; H04L 29/08576; H04L 29/08072; H04L 29/0809; H04L 29/06095; H04L 45/12; H04L 45/124
USPC .................................................. 709/241, 227
See application file for complete search history.

(56) References Cited

U.S. PATENT DOCUMENTS 6,104,710 A * 8/2000 Miyashita ..................... 370/350

* cited by examiner

*Primary Examiner* — Robert B Harrell
(74) *Attorney, Agent, or Firm* — Allen, Dyer, Doppelt, Milbrath & Gilchrist, P.A.

(57) ABSTRACT

Systems and methods for providing distributed network solutions to end user customers by acting as a neutral demarcation point between the last mile and the long haul portion of a telecommunications network. A network provisioning platform evaluates transport alternatives to identify routes and networks having the highest reliability metrics. Access circuits are aggregated to the optical level at the earliest possible point in the network. Service to on-net networks are provisioned rapidly.

20 Claims, 19 Drawing Sheets

Pending Cases

View: Pending Cases    Edit | Create New View

[ Close ]   [ Change Owner ]   [ Change Status ]

| ☐ Action | Case Number ▲ | Account Name | Case Reason | Inter connect City | Z Location | Carrier | Remote Hands |
|---|---|---|---|---|---|---|---|
| ☐ I Edit I Del | 00001001 | HP/Halo | Cross Connect | London | London,UK | Verizon Business | |
| ☐ I Edit I Del | 00001002 | HP/Halo | Cross Connect | London | Zurich, Switzerland | Verizon Business | |
| ☐ I Edit I Del | 00001003 | HP/Halo | Cross Connect | London | Grenoble, France | Verizon Business | |
| ☐ I Edit I Del | 00001004 | HP/Halo | Cross Connect | Dallas,TX | Alpharetta, GA | Verizon Business | |
| ☐ I Edit I Del | 00001005 | HP/Halo | Cross Connect | New York, NY | Marlborough, MA | Verizon Business | |
| ☐ I Edit I Del | 00001006 | HP/Halo | Cross Connect | London | London,UK | Cable& Wireless | |
| ☐ I Edit I Del | 00001007 | HP/Halo | Cross Connect | Singapore | Tokyo, Japan | Cable& Wireless | |
| ☐ I Edit I Del | 00001008 | HP/Halo | Cross Connect | New York, NY | New York, NY | Cable& Wireless | |
| ☐ I Edit I Del | 00001009 | HP/Halo | Remote Hands | Los Angeles, CA | | | LightSource1 |
| ☐ I Edit I Del | 00001011 | HP/Halo | Remote Hands | New York, NY | | | telx |
| ☐ I Edit I Del | 00001012 | HP/Halo | Remote Hands | New York, NY | | | telx |
| ☐ I Edit I Del | 00001013 | HP/Halo | Cross Connect | Dallas,TX | Nashville,TN | Verizon Business | |
| ☐ I Edit I Del | 00001014 | HP/Halo | Cross Connect | London | Rehovot, Israel | Bezeq | |
| ☐ I Edit I Del | 00001015 | HP/Halo | Remote Hands | Dallas,TX | Alpharetta, GA | | Looking Glass |
| ☐ I Edit I Del | 00001016 | HP/Halo | Remote Hands | London | Rehovot, Israel | | Datatechniques |

Show me fewer ▲ records per list page

FIG. 8

Case
00001001
<< Back to List: Cases

Help for this Page

Case Detail    Edit | Delete | Close Case | Clone | Printable View

| | | | |
|---|---|---|---|
| Case Owner | David Baule [Change] | Status | Sent LOA |
| Case Number | 00001001 | Priority | Medium |
| Contact Name | Sam Sam | Contact Phone | (555) 555-5555 |
| Account Name | tomerC | Contact Email | sam.sam@customer.com |
| Type | Installation | Case Origin | CoreConnect |
| Case Reason | Cross Connect | Interconnect City | London |
| Port Speed | DS3 | Interconnect Country | UK |
| Z Location | London,UK | Interconnect Facility | Redbus-Sovereign House |
| Order Number | 3458634 | Carrier | Verizon Business |
| Circuit ID | WOR 18230 | Remote Hands | |
| LEC ID | | | |
| CoreConnect ID | HPLD-VB-082906130811 | | |
| Due Date | 11/1/2006 | | |
| Invoiced | | | |
| Date/Time Opened | 8/29/2006 3:52 PM | Date/Time Closed | |
| Created By | David Baule,8/29/2006 3:52 PM | Last Modified By | David Baule,10/4/2006 1:29PM |
| Subject | | | |
| Description | DS3 Cross Connect to London | | |

Edit | Delete | Close Case | Clone | Printable View

---

Open Activities    New Task | New Event    Open Activities Help
No records to display

---

Activity History    Log A Call | Mail Merge | Send An Email | View All    Activity History Help

| Action | Subject | Name | Task Due Date | Assigned To | Last Modified Date/Time |
|---|---|---|---|---|---|
| Edit\| Del | Email:HP LOA | Sam Sam | ✓ 8/29/2006 | David Baule | 8/29/2006 4:01PM |

---

Case Comments    New    Case Comments Help
No records to display

---

Attachments    Attach File | View All    Attachments Help

FIG. 9A

| Action | File Name | Size | Last Modified |
|---|---|---|---|
| Edit Del View | LOA London to London DS3 VB 3.pdf | 12KB | 8/29/2006 4:58 PM |

Case History                                                  Case History Help

| Date | User | Action |
|---|---|---|
| 10/4/2006 1:29 PM | David Baule | Changed Contact Name from Sam Sam to Bob Bob |
| 8/29/2006 5:00 PM | David Baule | Changed Status from New to Sent LOA. |
| 8/29/2006 4:08 PM | David Baule | Changed Subject from Cross Connect to VB-London to DS3 Cross Connect to London. |
| 8/29/2006 3:53 PM | David Baule | Changed Case Origin from Email to CoreConnect. |
| 8/29/2006 3:52 PM | David Baule | Created. |

Show me ▼ more records per related list

FIG. 9B

Task
Email: DS3 Cross Connect to Bezeq                                    Help for this Page
<< Back to List: Cases

Task Detail        Edit | Delete | Create Follow Up Task | Create Follow Up Event
  Assigned To David Baule                    Status Completed
       Subject Email: DS3 Cross Connect to    Name Sam Sam
                   Bezeq
      Due Date 10/3/2006                 Related To 00001014
         Phone (541)715-5911                   Email sam.sam@customer.com
      Priority Normal                           Type
    Created By David Baule,10/3/2006 10:49 AM Last Modified By David Baule,10/3/2006 10:49 AM
     Comments Additional To: sam.sam@customer.com
                  CC: sm@core180.com
                  BCC: dbaule@core180.com
                  Attachment:

Subject: DSE Cross Connect to Bezeq
                  Body:
                  Hi Lyn- I've gone into CoreConnect are obtained the customer assignments for Joe and the DS3 to Bezeq.
                  Since this DS3 will go down as he swaps from old to new network. When would like me to
                  Coordinate?.

Thanks.
                  David

Core180.Inc
                  David Baule
                  +1 646.747.5136 Office
                  +1 973.650.5392 Mobile
                  +1 646.304.1714 Fax
                  dbaule@core180.com
                         Edit | Delete | Create Follow Up Task | Create Follow Up Event

FIG. 10 core180  Order Management System

Login - Order Management System
User Name: ☐
Password: ☐
☐ Remember me next time
[Login]
Forgot Your Password?
Enter your User Name to receive your password.
User Name: ☐ [Submit]

FIG. 11 core180  Order Management System

HOME  CUSTOMER ORDER  NETWORK DESIGN  QUOTATION  CARRIER ORDER  TROUBLE TICKET  REPORTS  ADMINISTRATION

Joe Gunde | Core180 | JGUNDE | SUPERSELLER | My Profile | Logout

::InBox
☐ New Customer Order(3)
☐ Create Design(2)
☐ Create Turn up(1)

::Announcements/Release Notes
Release 2.8 Features Notes
▫ WorkFlow:
　○ InBox for New Orders
　○ Tasks for each work step
　○ Timestamp task completions and move from task to task

| | core180 | | | | |
|---|---|---|---|---|---|
| HOME | CUSTOMER QUOTE | CUSTOMER ORDER | NETWORK DESIGN | | SEGMENT MANAG |
| REPORTS | DATA ADMINISTRATION | SYSTEM ADMINISTRATION | | ORDER BILLING INFO | C |

Harry Sti

::InBox

☐ Create Initial Design(42)

| | Baseline start date | Baseline end date | Instance Start Date | Instance End Date | InstanceTaskName |
|---|---|---|---|---|---|
| 1457S | 01-30-2009 | 02-02-2009 | 01-30-2009 | 02-02-2009 | |
| 1458S | 01-30-2009 | 02-02-2009 | 01-30-2009 | 02-02-2009 | |
| 1459S | 01-30-2009 | 02-02-2009 | 01-30-2009 | 02-02-2009 | |
| 1460S | 01-30-2009 | 02-02-2009 | 01-30-2009 | 02-02-2009 | |
| 1467S | 01-30-2009 | 02-02-2009 | 02-02-2009 | 02-03-2009 | |
| 1461S | 02-02-2009 | 02-03-2009 | 01-30-2009 | 02-02-2009 | |
| 1464S | 02-02-2009 | 02-03-2009 | 01-30-2009 | 02-02-2009 | |
| 1465S | 02-02-2009 | 02-03-2009 | 01-30-2009 | 02-02-2009 | |
| 1466S | 02-02-2009 | 02-03-2009 | 01-30-2009 | 02-02-2009 | |
| 1475S | 02-04-2009 | 02-05-2009 | 02-04-2009 | 02-05-2009 | |
| 1478S | 02-04-2009 | 02-05-2009 | 02-05-2009 | 02-06-2009 | |
| 1490S | 02-06-2009 | 02-09-2009 | 02-06-2009 | 02-09-2009 | |
| 1495S | 02-10-2009 | 02-11-2009 | 02-10-2009 | 02-11-2009 | |
| 1502S | 02-13-2009 | 02-17-2009 | 02-13-2009 | 02-17-2009 | |
| 1503S | 02-13-2009 | 02-17-2009 | 02-13-2009 | 02-17-2009 | |
| 1522S | 02-18-2009 | 02-19-2009 | 02-18-2009 | 02-19-2009 | |
| 1547S | 03-03-2009 | 03-04-2009 | 03-02-2009 | 03-03-2009 | |
| 881A-1 | 03-04-2009 | 03-05-2009 | 03-04-2009 | 03-05-2009 | |
| 987A-2 | 03-04-2009 | 03-05-2009 | 03-04-2009 | 03-05-2009 | |
| 1567S | 03-09-2009 | 03-10-2009 | 03-10-2009 | 03-11-2009 | |
| 1566S | 02-02-2009 | 03-11-2009 | 03-10-2009 | 03-11-2009 | |
| 1568S | 03-10-2009 | 03-11-2009 | 03-10-2009 | 03-11-2009 | |
| 1589S | 03-10-2009 | 03-11-2009 | 03-10-2009 | 03-11-2009 | |
| 1603S | 03-16-2009 | 03-17-2009 | 03-16-2009 | 03-17-2009 | |

» | 6 M. ▽ | Micr... | 3 M. ▽ | 3 W. ▽ | Que... | Pow... | 2 M. ▽ | OM...

FIG. 19

| Baseline Task | Baseline Start Date | Baseline End Date | Instance Task | Task duration | Instance Start Date | Instance End Date | Key Field | Assigned to | Assigned Date | Completed By |
|---|---|---|---|---|---|---|---|---|---|---|
| Create Initial Design | 7/8/2008 | 7/9/2008 | | 3 | 07/07/2008 | 07/09/2008 | 1011S-1 | | | Dionne Williams |
| Issue Carrier Order | 7/10/2008 | 7/10/2008 | | 1 | 07/09/2008 | 07/09/2008 | 1011S-1 | | | Dionne Williams |
| Issue Carrier Order | 7/10/2008 | 7/10/2008 | | 1 | 07/09/2008 | 07/09/2008 | 1011S-2 | | | Dionne Williams |
| Confirm Vendor Order Entry | 7/11/2008 | 7/14/2008 | | 2 | 07/09/2008 | 07/10/2008 | 1011S-2 | Kaya Thompkins | 07/09/2008 | Kaya Thompkins |
| Confirm Vendor Order Entry | 7/11/2008 | 7/14/2008 | | 2 | 07/09/2008 | 07/10/2008 | 1011S-1 | Kaya Thompkins | 07/09/2008 | Kaya Thompkins |
| Receive Vendor Order Number | 7/15/2008 | 7/17/2008 | | 4 | 07/10/2008 | 07/15/2008 | 1011S-1 | Kaya Thompkins | 07/09/2008 | Kaya Thompkins |
| Receive Vendor Order Number | 7/15/2008 | 7/17/2008 | | 1 | 07/10/2008 | 07/10/2008 | 1011S-2 | Kaya Thompkins | 07/09/2008 | Kaya Thompkins |
| Receive FOC Date | 7/18/2008 | 8/4/2008 | | 1 | 07/10/2008 | 07/10/2008 | 1011S-2 | Kaya Thompkins | 07/09/2008 | Kaya Thompkins |
| Receive FOC Date | 7/18/2008 | 8/4/2008 | | 9 | 07/15/2008 | 07/25/2008 | 1011S-1 | Kaya Thompkins | 07/09/2008 | Kaya Thompkins |
| Complete Carrier Order | 8/5/2008 | 8/14/2008 | | 7 | 07/25/2008 | 08/04/2008 | 1011S-1 | Kaya Thompkins | 07/09/2008 | Kaya Thompkins |
| Complete Carrier Order | 8/5/2008 | 8/14/2008 | | 1 | 07/10/2008 | 07/10/2008 | 1011S-2 | Markus Simms | 01/05/2009 | |
| Complete Test & Turnup | 8/15/2008 | 8/19/2008 | | 3 | | | | | | |
| Complete Order | 8/20/2008 | 8/20/2008 | | 1 | | | | | | |
| Customer Update Task | 8/7/2008 | 8/7/2008 | Update Customer Order Due in 15 Days | 1 | 08/07/2008 | 08/07/2008 | 1011S | Kaya Thompkins | 07/09/2008 | Kaya Thompkins |
| Customer Update Task | 8/7/2008 | 8/7/2008 | Update Customer Order Due in 10 Days | 2 | 08/12/2008 | 08/13/2008 | 1011S | Kaya Thompkins | 07/09/2008 | Kaya Thompkins |
| Customer Update Task | 8/7/2008 | 8/7/2008 | Update Customer Order Due in 5 Days | 1 | 08/17/2008 | 08/18/2008 | 1011S | Kaya Thompkins | 07/09/2008 | Kaya Thompkins |
| Customer Update Task | 8/7/2008 | 8/7/2008 | Update Customer Order Due in 0 Days | 3 | 08/22/2008 | 08/25/2008 | 1011S | Kaya Thompkins | 07/09/2008 | Kaya Thompkins |
| Customer Update Task | 8/7/2008 | 8/7/2008 | Update Customer Order Due in -3 Days | 2 | 08/25/2008 | 08/26/2008 | 1011S | Kaya Thompkins | 07/09/2008 | Kaya Thompkins |
| Customer Update Task | 8/7/2008 | 8/7/2008 | Update Customer Order Due in -6 Days | 1 | 08/28/2008 | 08/28/2008 | 1011S | Kaya Thompkins | 07/09/2008 | Kaya Thompkins |
| Customer Update | | | Update Customer Order | | | | | | | |

FIG. 20

# SYSTEM AND METHOD FOR PROVISIONING AND MANAGING NETWORK ACCESS AND CONNECTIVITY

CROSS-REFERENCE TO RELATED APPLICATIONS

This application claims priority to U.S. Provisional Patent Application Ser. No. 61/165,122, filed Mar. 31, 2009, which is hereby incorporated by reference herein in its entirety.

TECHNICAL FIELD

Embodiments of the invention relate generally to carrier network connectivity and, more particularly, to providing and managing carrier-neutral network access connectivity.

BACKGROUND INFORMATION

The traditional telecommunications carrier model provides bundled access to voice, data, and Internet services to all users. This carrier strategy places negotiating control between the carrier and users in the hands of the carrier. By requiring access as part of the bundled solution, the carrier model restricts users and limits future options based on past design decisions made by the carriers.

SUMMARY

Embodiments of the invention are directed to systems and methods for providing distributed network solutions to end user customers by acting as a neutral demarcation point between the last mile and the long haul portion of a telecommunications network. The network provisioning platform in embodiments of the invention evaluate transport alternatives to identify routes and networks having the highest reliability metrics. Access circuits are aggregated to the optical level at the earliest possible point in the network. Service to on-net networks are provisioned rapidly.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 8 illustrates an exemplary provisioner's screen for maintaining a work queue.

FIGS. 9A-9B illustrate exemplary screen for each work order.

FIG. 10 illustrates an exemplary e-mail managed by the system.

FIG. 11 illustrates a login screen.

FIG. 12 illustrates a main OMS screen.

FIG. 13 illustrates ticket system access screen.

FIG. 14 illustrates an enter ticket screen.

FIG. 15 illustrates a sample ticket entry.

FIG. 16 illustrates an add contact screen.

FIG. 19 illustrates an exemplary user interface display of the create instance design task for various customer orders.

FIG. 20 illustrates an exemplary user interface display of tasks for a particular customer order.

DETAILED DESCRIPTION

The following description of the embodiments is provided as an enabling teaching of the invention and its best, currently known embodiments. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

Figure 1:
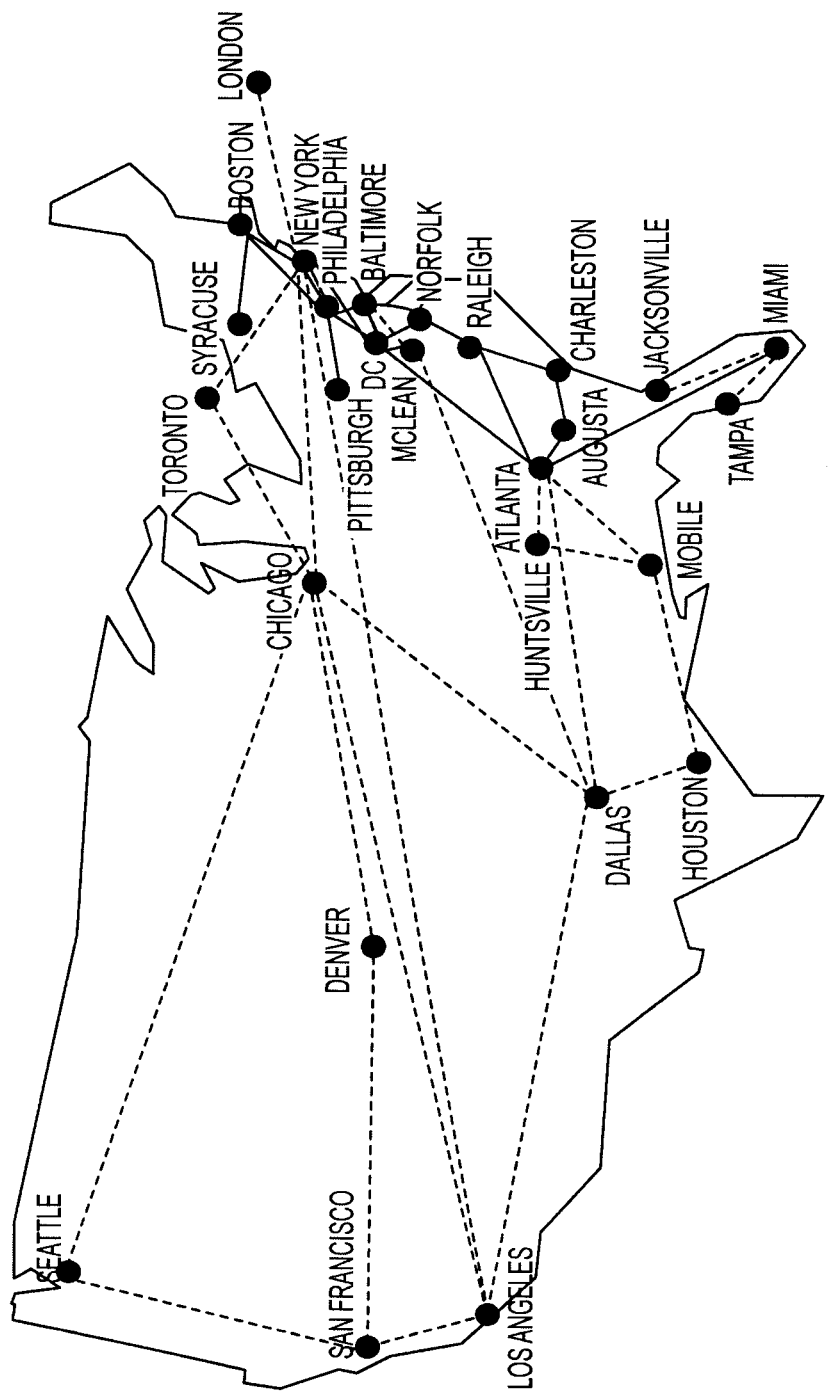
FIG. 1 illustrates a network backbone for the network access provisioning platform in accordance with an exemplary embodiment of the invention.

As illustrated in FIG. 1, the core network access provisioning platform (also referred to herein as "Core180") provides secure and dedicated long haul transport over the platform's private backbone network. The platform acts as a neutral gateway and virtual point of presence into significantly more providers than those that are available to the customer premise. The platform intersects hundreds of carrier networks and enables additional control including, but not limited to, location, speed, and value. The platform can deliver local connectivity to any endpoint in North America. The dashed lines in the figure represent future segments of the backbone network.

The core network access provisioning platform proactively manages company and client (customer) networks by providing: (1) network visibility through either a web-based portal, or application programming interface (API) integration; (2) managed cross connections, circuit mapping, and testing for end-to-end control; (3) a 24×7 network control center for integrated trouble ticketing and resolution; and (4) real time remote monitoring and diagnostics.

In one embodiment, a customer Order Management System (OMS) manages a plurality of operational functions, including, but not limited to, sales quotes, requests for vendor pricing, equipment inventory, costs, selection and management of vendors (i.e., carriers), order fulfillment, and trouble ticketing. The OMS facilitates the unique process flow for fulfilling orders and supplier management, from creating customer quotes to final customer acceptance of service to management and maintenance of the service. The unique process flow captures the network access provisioning platform model, which involves identifying, ordering and integrating multiple carrier services into the platform's own value added services. Unlike traditional carriers, that typically route the bulk of their services through their own networks, integrating only tail circuits from other carriers, the network access provisioning platform integrates a variety of services and segments from many suppliers at unique integration points in the provisioning platform's backbone network to provide the best price/performance value to end user customers.

The OMS provides a plurality of screens, processes and data to support the network access provisioning platform. The OMS can obtain orders from multiple customers and/or resellers; design end-to-end services with selection of any available supplier for any segment or section; manage the ordering, installation and integration of multiple supplier services; and maintain these services across multiple suppliers through the lifetime of the service.

The major components of the network access provisioning platform can include one or more of the following functions:
1. order entry and management—can manage all ordering data;
2. end to end design—can develop route options;
3. supplier quoting—can obtain and manage quote requests from multiple suppliers for multiple route options;
4. supplier ordering—can manage the ordering of selected quotes/suppliers and track the pricing through its lifetime;
5. installation—can manage the installation of the segments and suppliers;
6. test and turn-up—can manage the customer testing and acceptance;
7. billing—can manage the billable service components provided to customers and resellers;
8. engineering—can manage the detailed service and infrastructure equipment and assignments;
9. trouble ticketing—can manage the ongoing maintenance and support of services;
10. workflow—can assign work to users based on tasks defined in the system, so that users are task driven and the work is performed timely.

Figure 18:
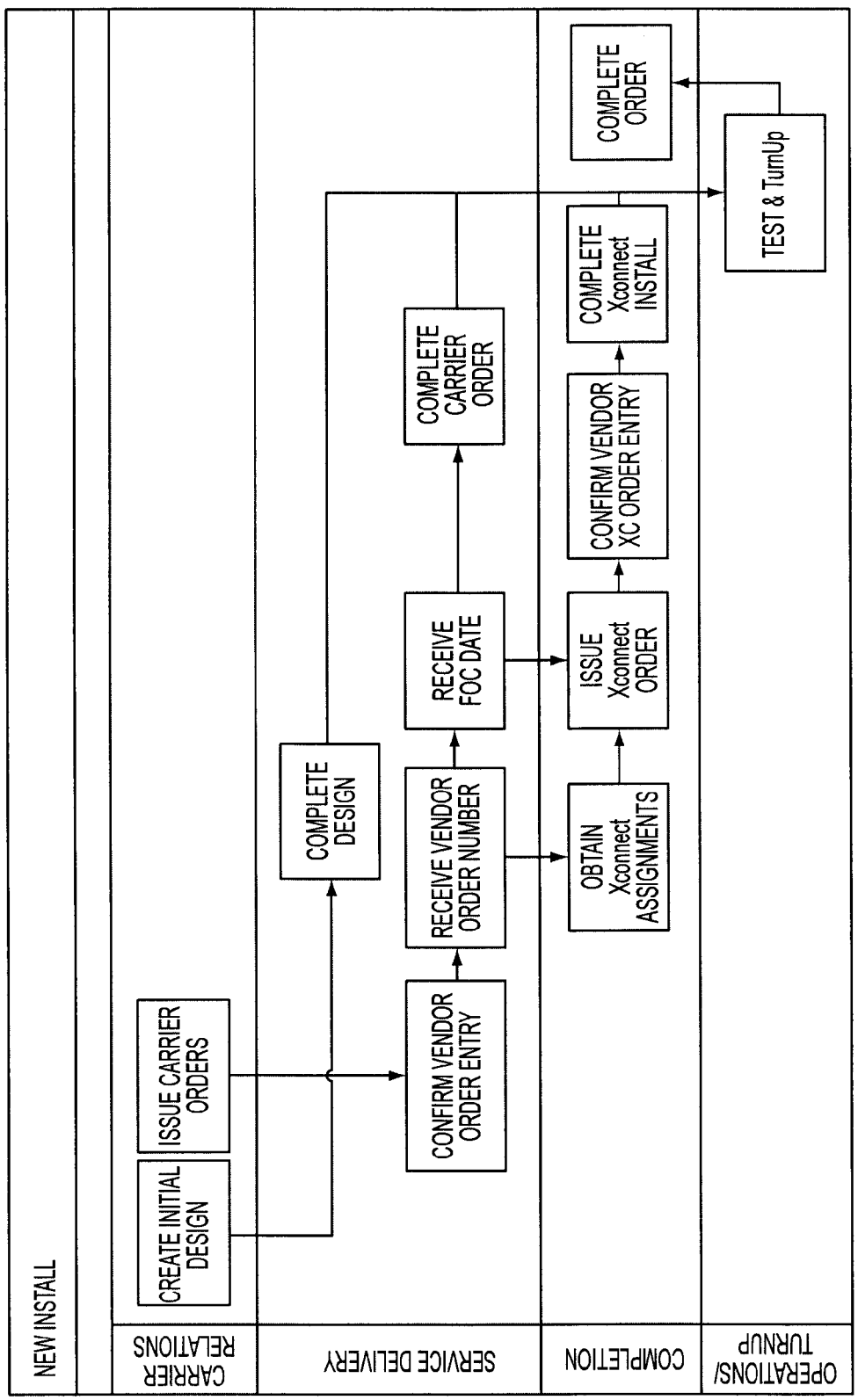
FIG. 18 illustrates an exemplary new "Install Customer Order" workflow.

In an exemplary embodiment, OMS utilizes a unique workflow capability. The workflow identifies a series of tasks for users to perform and complete based on steps for fulfilling a process. The process can be any process requiring user interaction with screens and data to fulfill the process steps. The workflow engine is defined generically herein so that a workflow (WF Item) can be created for any set of data (e.g., a customer order, a carrier order, a trouble ticket, an engineering work request, creation of a customer invoice), using configuration capabilities only, without recoding any software. An example of a new "Install Customer Order" workflow is show in FIG. 18. The resulting tasks for this workflow are shown in FIG. 19. The tasks for a particular customer order are shown in FIG. 20.

The workflow engine is capable of attaching workflows to other workflows, so that a chain of workflows can be created. For example, a workflow for carrier orders can be attached to a workflow for customer orders, so that a single customer order can initiate tasks for multiple carrier orders.

As can be seen in FIG. 20, the workflow also defines a baseline set of tasks, that represent the expected start and end dates of tasks for that instance of a workflow. The actual tasks may start and end before or after the baseline start and end dates. The discrepancies can be flagged and reported on, as required.

Workflows can be ordered in a number of ways: (1) a task can lead to one or more subsequent tasks, (2) a task can be initiated by one or more preceding tasks, (3) completion of tasks can be made contingent on the status or value of variables associated with the WF Item. For the first method of ordering, a task can lead to one or more subsequent tasks either after all subsequent tasks are initiated, or after only a subset of the subsequent tasks are initiated. For the second method, a task can be initiated by one or more preceding tasks either after all preceding tasks are completed, or after one or more of the preceding tasks have been completed. For the third method, completion of tasks can be made contingent on the status of a variable associated with the WF Item, such as the entry of a FOC date before the get FOC date task can be completed.

Workflows can be owned by specific workgroups and the manager of the workgroup can assign individuals to that workflow, or to specific tasks in the workflow. In that case, only the manager sees the tasks until they are assigned, at which point the tasks become visible to the assigned individual, as well as to the manager. The manager can also reassign tasks at any time, as required.

The workflow engine can also generate ad-hoc tasks based on conditions defined by data configuration. For example, if a task is overdue by a certain number of days, a reminder task can be initiated, such as a customer update task, to provide information to the customer on that date. E-mail can be sent out to individuals or groups on task initiation or task completion, as required. A more detailed description of the OMS and its components follows the description of the price generator application.

In another embodiment, a Price Generator application provides and manages pricing requests from the Defense Information Systems Agency (DISA). The Price Generator allows DISA users to request and obtain prices for circuits between any combinations of nearly 500 military locations. The circuits can be used for voice, data and Internet traffic, with circuit speeds (bandwidths) ranging from 56 Kbps to OC-192 (9953 Mbps). Optical Carrier (OC) levels describe a range of digital signals that can be carried on SONET fiber optic networks. OC-192 is a network line with transmission speeds of up to 9953 Mbps. Pricing is based on the end locations and the speed of the circuits and is provided separately for each year of the DISA contract. The tool, the user interface and the pricing database for this embodiment were developed based on extensive analysis of DISA's requirements, the geographic distribution of the 500 military locations, network costs over time, location accessibility, currently available network services, network transition status, among other factors, and, as such, represents a unique tool that captures a significant corporate knowledge base. The resulting pricing database contains nearly 10,000 price point combinations, which is expected to continue growing.

The Price Generator software, user interface and data represent inseparable components of an integrated application built specifically to meet the needs of DISA's extensive pricing requirements in terms of the number of locations serviced, the range of services, and the number of years (10) over which pricing is provided.

To effectively manage pricing efforts, the following activities have to be coordinated: (1) Sales requesting pricing for customers; (2) Operations requesting costs from carriers, (3) Operations/Management setting the customer price based on costs and margin; (4) Sales providing a quote to the customer; and (5) capturing customer feedback on the price. In the following description, references to price relate to quotes to customers, and references to cost relate to payments to vendors.

The Pricing Tool is separate from OMS in order to avoid creating facility records and establishing network segments in order to get quotes that may not turn into orders.

Step 1: Sales Requests for Quotes

A standard interface enables Sales to request pricing from Operations for each distinct customer requirement. In one embodiment, an input screen is provided that Sales can populate with the quote details. The applicable data entry fields for the input screen could include:
1. Customer Name
2. Customer A Loc Address, City, Zip, NPA-NXX
3. Customer Z Loc Address, City, Zip, NPA-NXX
4. Speed
5. Term
6. Customer Request for Quote (RFQ) Number—will correlate to customer A/Z locations (number auto populated when RFQ created)
7. Date Customer RFQ Created (auto populated)
8. Sales Quote Date (auto populated when Sales Quote is generated)
9. Sales Quote Interval (calculation of number of days between Date Customer RFQ created and Sales Quote Date).

Once the salesperson has created a customer RFQ, Operations could receive an e-mail notification that a Customer RFQ has been created, with the data entered in the fields above.

Step 2: Carrier Request for Quote Generation

The pricing requests sent to each carrier, and their responses, need to be tracked. The Carrier RFQs can be sent to multiple vendors, and may include several network segments per Customer RFQ. In one embodiment, the fields that drive the carrier RFQ (Customer RFQ Number, Customer Name, Customer A/Z Loc, Speed and Term), would be carried over from the Sales input screen. Operations would define the network segments that require Carrier RFQs. Operations would select the carriers to receive Carrier RFQs (from a list of carrier options). The system would automatically assign a Carrier RFQ number (e.g., the Customer RFQ number plus a suffix for each segment), and create a database entry for each quote requested. Operations populates the cost fields for each Carrier RFQ as vendor quotes are received.

For example, a Customer RFQ (#123) could include three network segments, two of which are off-net and need quotes. Segment 1 could be sent to three carriers, and Segment 2 could be sent to two vendors. This would mean that five entries would be generated in the Carrier Request for Quote database: Verizon Business, XO and Cavalier could have an entry for Carrier RFQ #123-01, and Verizon Business and Qwest could have an entry for Carrier RFQ #123-02. The on-net segment would be priced as part of the Sales Quote Generation process.

The applicable data entry fields for each Carrier RFQ entry could include:
1. Customer RFQ Number—would correlate to customer A/Z locations (data carried over from Sales Input Screen)
2. Customer Name (data carried over from Sales Input Screen)
3. Customer A and Z Loc Address/City/Zip/NPA-NXX (data carried over from Sales Input Screen)
4. Date Customer RFQ received (data carried over from Sales Input Screen)
5. Network Segment A and Z Loc Address/City/Zip/NPA-NXX (allow up to 3 network segments per Customer RFQ)
6. Carrier RFQ Number—will correlate to segment A/Z locs (automatically populated when network segment is created)
7. Speed (data carried over from Sales input screen)
8. Term (data carried over from Sales input screen—with override capability)
9. Date Carrier RFQ Sent
10. Date Carrier RFQ Response Received
11. MRC Quote
12. MRC Revised Quote (BAFO)
13. NRC Quote
14. NRC Revised Quote (BAFO)
15. Least Cost Alternative (Y/N)
16. Notes/Special Terms for Quote
17. Carrier Quote Interval (calculation of number of days between Date Carrier RFQ Sent and Date Carrier RFQ Response Received).

A table having the following fields would be sent to the vendors: (1) Carrier RFQ Number; (2) Network A and Z Loc Address/City/Zip/NPA-NXX; (3) Speed; (4) Term; (5) MRC; (6) NRC; and (7) Notes/Special Terms.

The system can query the Carrier RFQ database on the following fields: (1) Customer RFQ number; (2) Carrier RFQ Number; (3) Customer A and Z Locs; (4) Network Segment A and Z Locs; (5) Speed; (6) Customer Name; (7) Carrier.

Step 3: Sales Quote Generation

For each segment, Operations can review/populate the following components:
1. Least Cost Alternative MRC for each Network Segment—allow up to 3 network segments—(auto populated when Least Cost Alternative flag is Y on Carrier RFQ screen)
2. Least Cost Alternative NRC for each Network Segment—allow up to 3 network segments—(auto populated when Least Cost Alternative flag is Y on Carrier RFQ screen)
3. Markup % on Access (to be applied to Network Segments for MRC and NRC Costs)
4. Markup $ on MRC (calculate $—apply markup % to sum of Network Segment MRC Costs)
5. Markup $ on NRC (calculate $—apply markup % to sum of Network Segment NRC Costs)
6. Core Network Price
7. Egress Port Price
8. Ingress Port Price
9. Total Cost (calculate total of all Least Cost Alternative MRC and NRC fields)
10. Total Customer MRC (calculate total of all MRC cost and markup fields)
11. Total Customer NRC (calculate total of all NRC cost and markup fields)
12. Total Customer Price (Total Customer MRC plus Total Customer NRC)
13. Total Customer Price Adjusted (with override capability)
14. Margin % (calculate % as ((Total Customer Price−Total Cost)/Total Customer Price)
15. Sales Quote Date (auto populated when Sales Quote generated)
16. RFQ Valid through Date (calculate Sales Quote Date plus 30 days, with override capability)

Step 4: Sales Quote Form

After the Sales Quote is completed, a form is automatically sent to the Sales originator, and/or can be created by Sales. The form could include standard language for disclaimers and the following data fields:
1. Customer Name
2. A and Z Loc Address/City/Zip/NPA-NXX
3. Speed
4. Term
5. Customer Request for Quote (RFQ) Number
6. Customer MRC
7. Customer NRC
8. Notes/Special Terms
9. Sales Quote Date 10. Valid through Date (30 days after sales quote generated).

Step 5: Customer Response

After the quote process, the system tracks whether the Sales Quote resulted in an order. The applicable fields for Sales to update include the following:
1. Order Received Status (Y/N)
2. If N, Reason
3. If N, Winning Price Point
4. Sales Notes The Sales Request for Quote database could be queried on the following fields: (1) Customer Name; (2) Customer A and Z Locations; (3) Speed; (4) Order Received Status; and (5) Sales Notes.

Simple Order Management

The general functionality of order management includes the following: (1) customer circuit orders (enter, edit, show status); (2) design segments of circuit; (3) request carrier quotes for segments or whole circuit; (4) order segments from carrier; (5) close order→send completion notice; and (6) show status of order to customer and resellers.

The roles of customer, user, and reseller are as follows: (1) customer—can view only customer order status; (2) user—all functions; and (3) reseller—can enter/edit customer orders and view order status.

The functionality of the customer orders process includes the following:

Enter Order (User or Reseller)

The steps in entering the order are:
1. User clicks on Customer Order Entry
2. Customer Order Entry screen is shown to user
3. User selects customer and enters general and circuit information on the screen
4. User submits the information
5. The system updates order type, contracted date, order ID, circuit ID, order status, circuit status.

The general information entered on the order entry screen includes:
1. Customer (from pick list)
2. Order_Type=Customer
3. Order Version
4. Date received
5. Customer requested date
6. Requestor
   a. Associated with customer
   b. From pick list
   c. If not available→click to add
7. Task Order #
8. Expedite
9. PO
10. Reseller NRC
11. Reseller MRC
12. CIT Contact information
    a. Associated with customer
    b. From pick list
    c. If not available→click to add
13. Contract term The circuit information entered on the order entry screen includes: (1) speed; (2) CCSD; (3) framing; (4) line code; (5) protection; (6) channelization required (yes/no); and (7) TSP Authorization Code.

The site information entered on the order entry screen includes the following:
1. Site A, Site Z
   a. From pick list by name of site
   b. Click to search by State, City→select from grid
   c. If not available→click to add 2. Delivery Point information When customer order is entered, the following fields are set as indicated:
1. Set Order Status="New"
2. Set Order_Type=Customer
3. Create OrderID
4. Create CircuitID
5. Set Circuit Status="To be Designed"
6. Contract Date
   a. Fill in from algorithm
      i. 30 calendar days for speed<=DS3
      ii. 45 calendar days for speeds>DS3

Customer orders (user or reseller) can be searched and/or edited as follows: (1) order ID; (2) circuit ID; (3) CCSD; (4) speed; (5) received date (date range); (6) customer requested date (date range); (7) site A; (8) Site Z.

Design Segments (User)

The purpose of the design segments process is to take an end to end customer circuit and design possible segments that will support the circuit. The segments are sequenced, 1, 2, 3, . . . starting from Site A of the circuit to Site Z of the circuit. Each segment record has one site, a site that represents either an intermediate site between Site A and Site Z of the circuit, or, if it's the last segment (or the only segment), the Site information is the Site Z of the circuit. Each segment can be an existing facility, an in service facility, a facility being installed or a potential facility that does not exist and may never actually exist. The designer should be able to create many different designs for the same circuit, each design with different segments or different number of segments.

The designer selects the circuit to be designed, starts with the first segment, selects either an existing segment or creates a new segment, and adds information about the segment. The designer then goes to the second segment and repeats the process until all segments desired have been added. The designer can then designate a certain design as the preferred design.

The functionality of the design segments process includes the following:

The user searches customer orders or circuits (design screen)—the search criteria would be similar to search order screen. The user selects the order desired from a grid. A screen is displayed with circuit information (including Site A and Site Z). Design options are then created as below.
1. Enter Design Option name (for example "Option 1")
2. The screen adds a grid with one line for the first segment of the option
3. Insert a segment into the first line
   a. Have a choice of an existing segment or facility or create new segment
   b. Search for existing segments to add by searching on by facility name or by Site A/Site Z and speed
      i. Search
         3. The search should bring up a grid of possible segments and show the "total capacity" of the segment and the remaining available capacity
         4. "Total capacity" is Speed, Number of Channels and Channel Type (note: Channel Type has same values as Speed)
         5. Available Capacity=Number of Channels−(sum of circuits riding on the segment with Facility.ChannelType=Circuit.Speed)
      ii. Select the segment desired and the Site of the segment that will act as the Site Z of the segment 1. Add a new segment
   a. Select a site from existing sites by name or by site search. The Site selected will become the Site Z of the segment record.
   b. Enter segment information
      i. Segment Name
      ii. Carrier
      iii. Speed
2. Mark desired segments as "Carrier Query"

Create Carrier Queries

Creating Carrier Queries involves selecting a segment from a design that does not have a carrier associated with (design segment) and requesting quotes from a number of carriers for the MRC, NRC and term of that segment. The queries are e-mailed to the selected carriers (e-mail addresses obtained from contact who are listed as the carrier query/ordering contacts). The e-mail contains a link to allow the carrier to enter the quote directly into the system. The carriers may also return quotes by e-mail, by letter or telephone, in which case, the quotes need to be entered into the system manually.

The create carrier queries process includes the following steps:
1. Select segment from a segment select screen or click on segment action button next to segment in Design screen
   a. Create Query ID
   b. Show screen
   c. Add required information
      i. Segment/facility if not already selected
      ii. Carrier(s)
      iii. Site A
      iv. Site Z
      v. Speed
      vi. Expedite
      vii. Protection Required
      viii. TSP Authorization Code
2. The email segment query requests to carriers should include MRC, NRC, Term,
   Validity of quote (e.g., number of days or months quote is good for), carrier quote number. The e-mail also should provide the following data: requested date, query ID, speed, site A (full address), site Z (full address), expedite, TSP authorization code, protection.
3. Upon response from carriers to queries (i.e. carrier quotes), the user should be able to enter the following information into a quote result (or, if the response is through the link provided the carrier, the following information should be stored in association with the query): (1) date of quote; (2) carrier quote ID; (3) MRC; (4) NRC; (5) term; (6) validity
4. If the quote is returned through the link, an e-mail should be sent to the user informing the user that a quote is available and the details of the quote
5. After the user has decided which quote to select for the segment, the quote should be marked as "Selected" and the segment/facility status should become "Ready to Order."
6. Facility statuses: Design, Ready to Order, In Service, Terminated.
7. Search/edit segment information includes: Carrier, CCSD, Circuit ID, Order ID, Speed, Site A, Site Z
8. Assign/utilize capacity on segment Carrier Orders (User) Process:
1. Search segments marked as "ready to order"
2. Create carrier orders for segments
   a. Set Order Type="Carrier"
   b. Enter additional order information
   c. Attach order document
3. Search/edit by (a) CCSD, (b) Order ID, (c) Circuit ID, (d) Carrier, (e) Speed, (f) Site A, (g) Site Z, (h)
   Add FOC date
   Add Facility_Accept_Date
   Complete Order (User)
4. Add Circuit_Accept_Date
5. Add Tag_A_End
6. Add Tag_Z_End
7. Create CSA number
8. Create Notice of Completion
9. Change customer order status to "accepted"
   Customer Order Status (User, Reseller, Customer)
10. Search on customer order information
11. Show grid of Customer order information with status and dates
    Carrier Order Status (User)
12. Search on carrier orders
13. How grid of carrier order information with status and dates Customer Control System Requirements The network access provisioning platform provides a port cross connect service, in which customers, with communications equipment located at major hub facilities around the world, can manage the data associated with the infrastructure at these locations and request from the network access provisioning platform service provider cross connects between customer equipment and selected carriers. The customers can also make port assignments, select the carriers and request network access provisioning platform work. The network access provisioning platform service provider arranges for the implementation of the cross connects at the customer locations.

Figure 2:
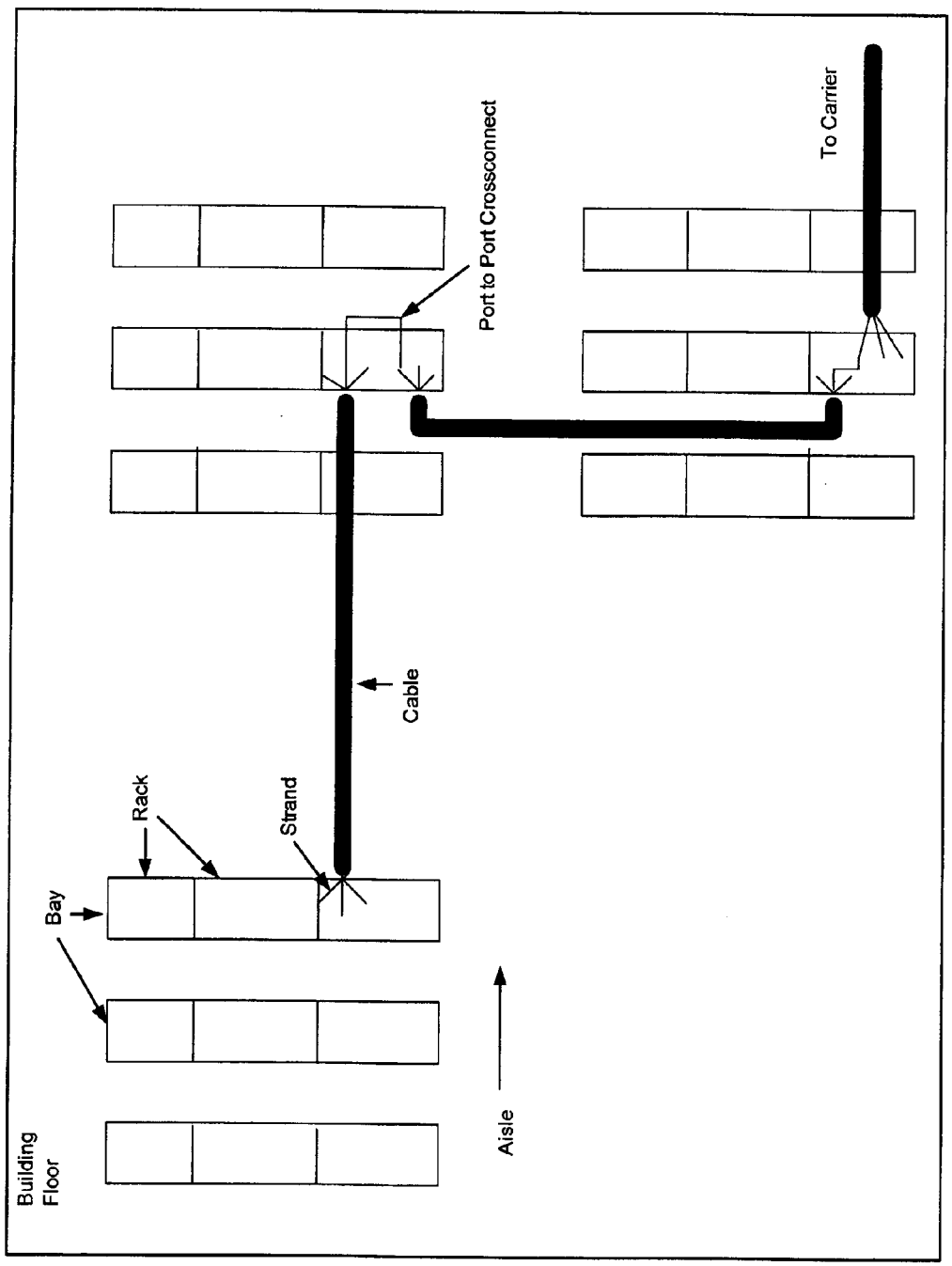
FIG. 2 illustrates an exemplary building and floor equipment and connectivity layout.
Figure 3:
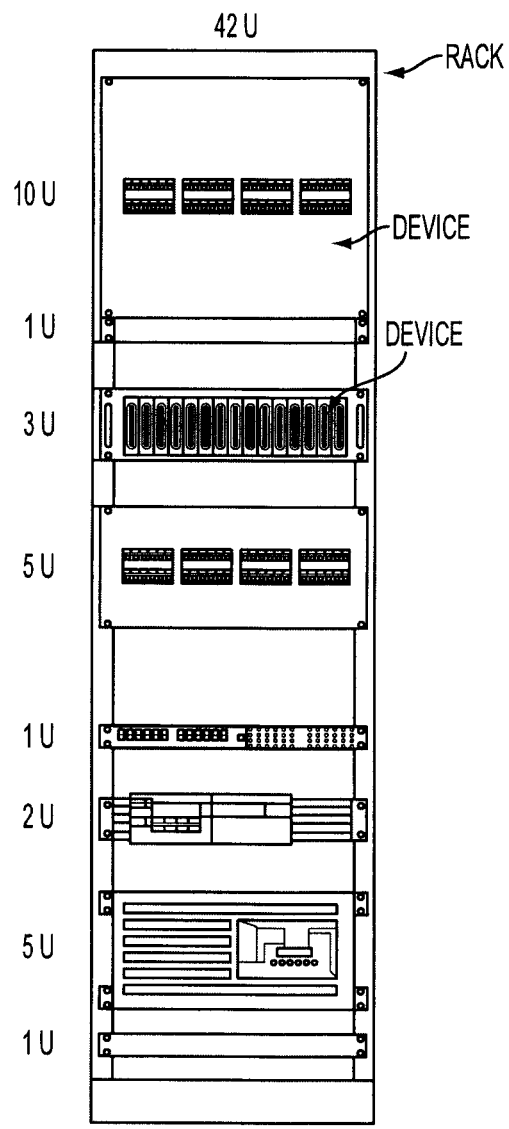
FIG. 3 illustrates an exemplary rack layout.

FIG. 2 illustrates the building and floor equipment and connectivity layout in one embodiment. It shows the location of the port to port cross connect vis a vis the customer equipment and carrier network. FIG. 3 illustrates a typical rack layout.

The network access provisioning platform allows customers to assign and order their cross connects and manage the data on an ongoing basis. The system provides the following functions: (1) maintain the inventory of hub facilities, devices at the facilities, circuits and interconnections for customers; (2) allow customers to select devices, ports and carriers for interconnection of circuits at the hub facilities; (3) allow customers to request manual work from the network access provisioning platform service provider, local field operations or carriers for installation of equipment and circuits, installation of cross connects, test and turn-up of equipment and circuits, and maintenance activities, such as troubleshooting; (4) allow service provider personnel to act as agents for the customers; (5) allow the network access provisioning platform service provider to generate, manage, issue and receive Letters of Agency (LOAs) to perform work on behalf of their customers; (6) allow field operations forces to receive and complete work orders; (7) allow the network access provisioning platform service provider to track billable events and billable time; and (8) provide a high level of data segregation and security between customers.

For work requests the system is generally expected to work as a process flow; work requests will flow from requestors to provisioners to field operations personnel and carriers. At each step some manual work (tasks) will be performed, information about that work step will be updated and the work will flow to the next step of the process. In some cases, work steps may split and subsequently merge. Examples of provisioner screens are illustrated in FIGS. 8 and 9A-9B.

Figure 4:
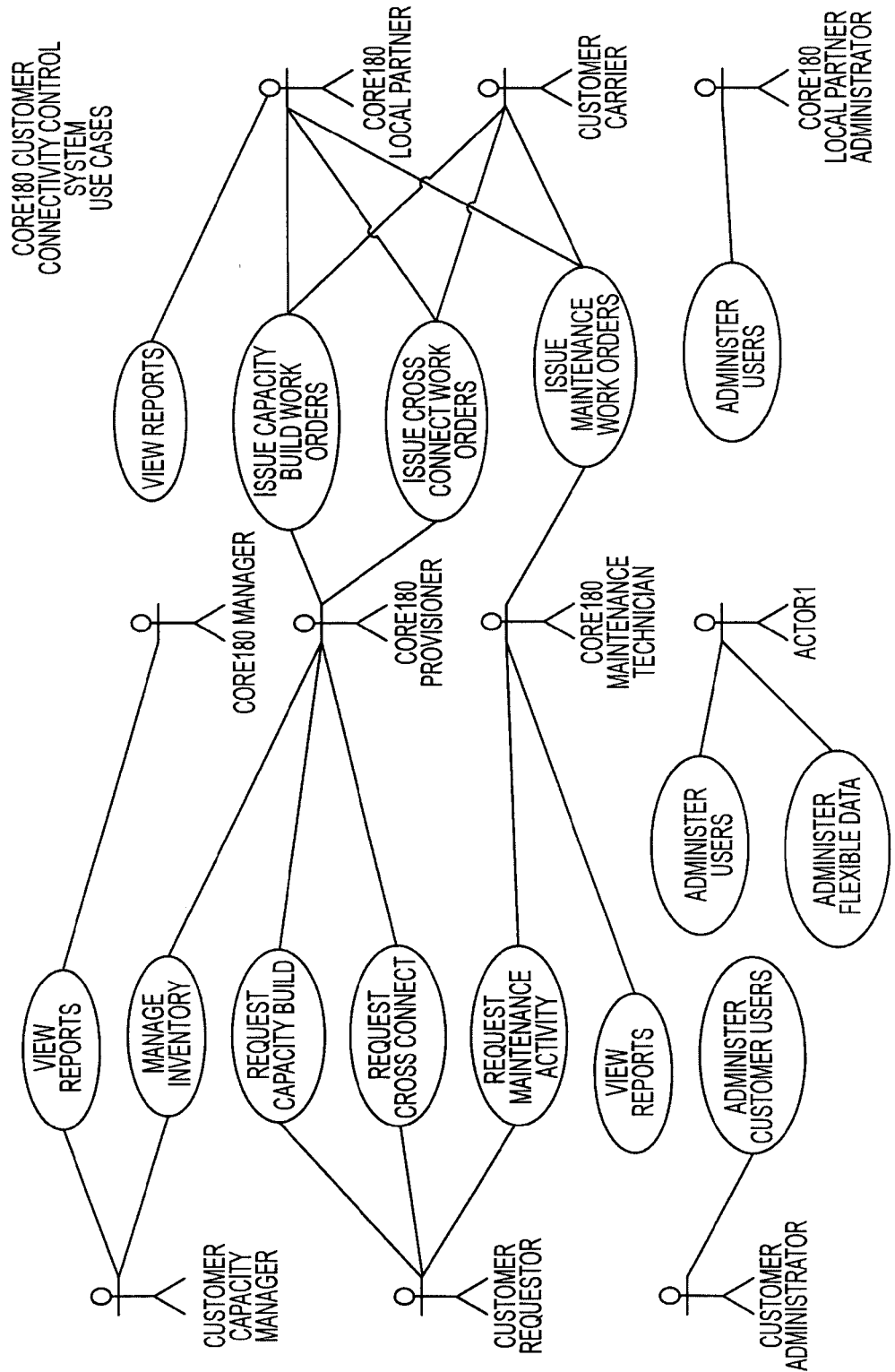
FIG. 4 illustrates exemplary customer connectivity control system use cases.

The high level functions of the system are illustrated in the use case diagram of FIG. 4. Users of the system take on the following roles:
1. Customers
   a. Capacity Managers
   b. Requestors
   c. View only users
   d. Administrators
2. Network Access Provisioning Service Provider
   a. Provisioners
   b. Maintenance Technicians
   c. View only users
   d. Administrators
3. Network Access Provisioning Service Provider Local Partners
   a. Field Technicians
   b. View only users
   c. Administrators
4. Application administrators
   a. Database
   b. Application flexibility functions, such as defining new fields.

Customers are able to perform the following functions:
1. Securely log into a web site
2. Select the function/work request to be performed
   a. Capacity Build Functions
      i. Check for available capacity
      ii. Request additional capacity (request goes to Core180)
      iii. Change status of capacity build process
      iv. Add/change/delete assignable equipment
      v. Request Test & Turn up of new capacity (request goes to Core180)
      vi. View status of capacity requests
      vii. View equipment inventory
      viii. View history of Capacity Build Requests
   b. Cross Connect Functions
      i. View existing and available inventory for cross connection
      ii. Request new cross connect (request goes to Core180)
      iii. Change/cancel existing cross connect requests
      iv. Cancel existing cross connects
      v. View existing cross connect requests and their status
      vi. Request Test & Turn up of new cross connect
      vii. Request information from Core180 on cross connects
      viii. View history of Cross Connect requests
   c. Maintenance Functions
      i. Request maintenance on equipment or cross connect
      ii. View status of maintenance requests
   d. Reports
      i. Capacity/utilization
      ii. Activity
   e. Administration Functions
      i. Add/change/delete customer users
      ii. Add/delete carriers for customer
      iii. Add/delete/change carrier information Network Access Provisioning Service Provider Functions
The system supports the following network access provisioning service provider functions:
1. Securely login to website
2. Select the function to be performed
   a. Capacity Build Functions
      i. Add/change/delete Core180 assignable inventory
      ii. View requests for capacity builds
      iii. Change status/update capacity build requests
      iv. Issue Capacity Build Work Orders to local partners
      v. Issue Test & Turn up Work Orders to local partners
      vi. View equipment inventory
      iv. View History of Capacity Build Requests
   b. Cross Connect Functions
      i. View requests for cross connects
      ii. Change/update status of cross connect requests
      iii. Issue Letter of Agency and cross connect orders to customer carriers
      iv. View inventory of cross connects
      v. Issue Work Orders for cross connects to partners
      vi. Issue Work Orders for Test & Turn up to partners
      vii. View history of Cross Connect and test & Turn up Requests
   c. Maintenance Functions
      i. View maintenance requests
      ii. Change/update status of maintenance requests
      iii. Issue Work Orders to partners for maintenance work
      iv. View history of maintenance requests
   d. Reports
      i. Capacity/utilization
      ii. Activities
   e. Administration Functions
      i. Add/delete/change Core180 users
      ii. Add/delete/change master/admin customer user(s)
      iii. Add/delete/change master/admin partner user(s)
      iv. Add/delete/change sites/locations
      v. Build/change template Letter of Agency documents Network Access Provisioning Service Provider Partner Functions:
The system supports the following network access provisioning service provider partner functions:
1. Securely login to website
2. Select the function to be performed
   a. Capacity Build Functions
      i. Update equipment inventory
      ii. View Work Orders for Capacity Builds and Test & Turn ups
      iii. Change status/complete/update Capacity Build & Test & Up Orders
      iv. View equipment inventory
      v. View history of Capacity Build & Test & Turn Up Work Orders
   b. Cross Connect Functions
      i. View Work Orders for cross connects
         1. Example screens are shown in the Appendix
      ii. Change status/complete/update Work Orders
      iii. Update cross connect data
      iv. View inventory of cross connects
      v. View history of cross connect Work Orders
   c. Maintenance Functions
      i. View maintenance Work Orders
      ii. Change status/complete/update maintenance Work Orders
      iii. View history of maintenance Work Orders
   d. Reports
      i. Capacity/utilization
      ii. Activities
   e. Administration Functions
      i. Add/delete/change partner users Example Process Flow Capacity Build Requests The following describes an example flow for capacity build requests. The flow involves a particular type or work request and the tasks associated with the work request.

Figure 5:
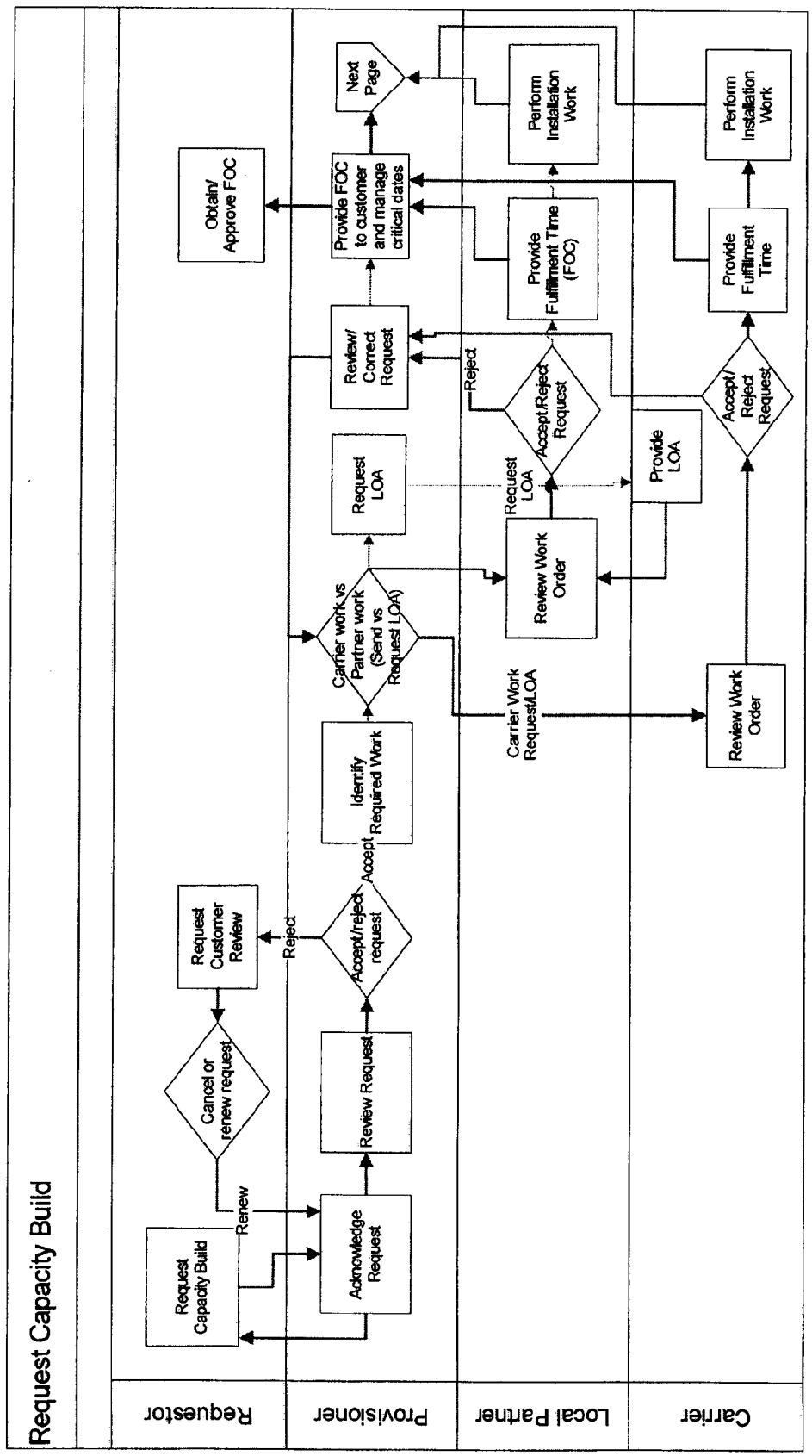
FIG. 5 illustrates a capacity build request including request and fulfillment.
Figure 6:
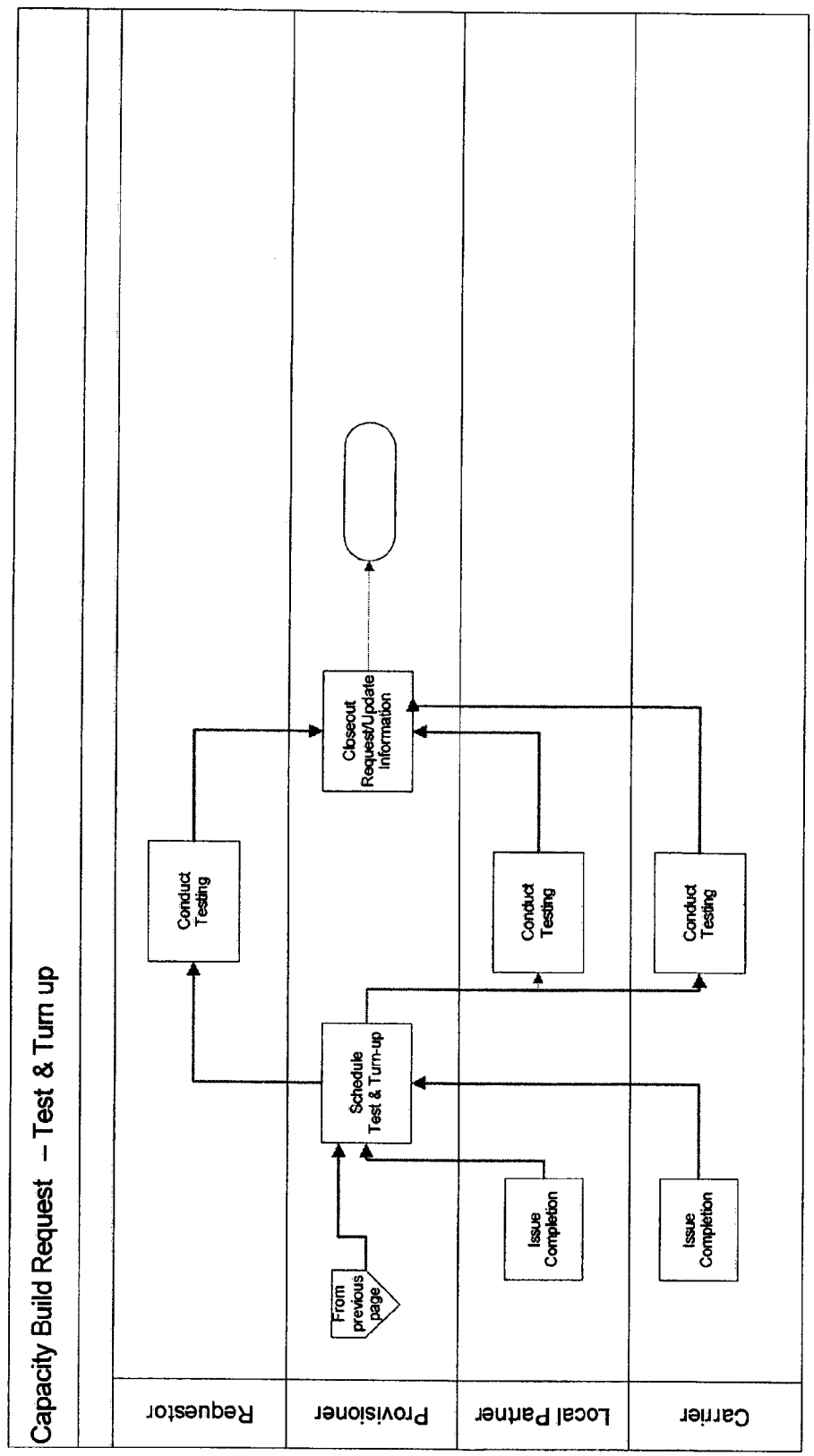
FIG. 6 illustrates capacity build request process including test and turn up.

FIGS. 5-6 show an example process flow for capacity builds:
1. Capacity Build Requestor
   a. Views existing inventory (tables and graphs)
   b. Requests network inventory enhancement. Request information can be both structured and free form. Requestor indicates who will do the work (network access provisioning service provider or carrier)
   c. System creates Request Number, time stamps the request, and defines the initial request status
   d. Request triggers notification to provisioner (e-mail and on screen work queue item).
2. Provisioner
   a. Acknowledges the request (e-mail and screen work item). Status changes to acknowledge
   b. Reviews request and may send request:
      i. back to requestor for further information
      ii. reject request (with an explanation)
      iii. accept info (acceptance goes back to requestor)
   c. Issues Work Orders and Letters of Agency (LOA), as required (status changes to provisioning)
   d. System creates subsidiary Work Order numbers and time stamps related to the Request Number. If network access provisioning service provider will do the work, LOA is sent to carrier. If carrier will do work, request LOA from carrier.
3. Network Access Provisioning Service Provider Partner is triggered by the Work Order (system sends e-mail and/or updates a work queue).
4. Partner/Carrier
   a. Provides completion date. Status changed to FOC
   b. When partner and carrier complete work, the status of the work order is updated to test and turn up
   c. System triggers potential jeopardy to provisioner work queue at completion date—x (x is administrator settable).
5. Provisioner updates test and turn up dates
   a. On completion of test and turn up, status is changed to complete
6. System triggers potential jeopardy to provisioner work queue (and send e-mail) at test and turn up date—y (y is settable by administrator)

Example Database/Object Structure

Figure 7A:
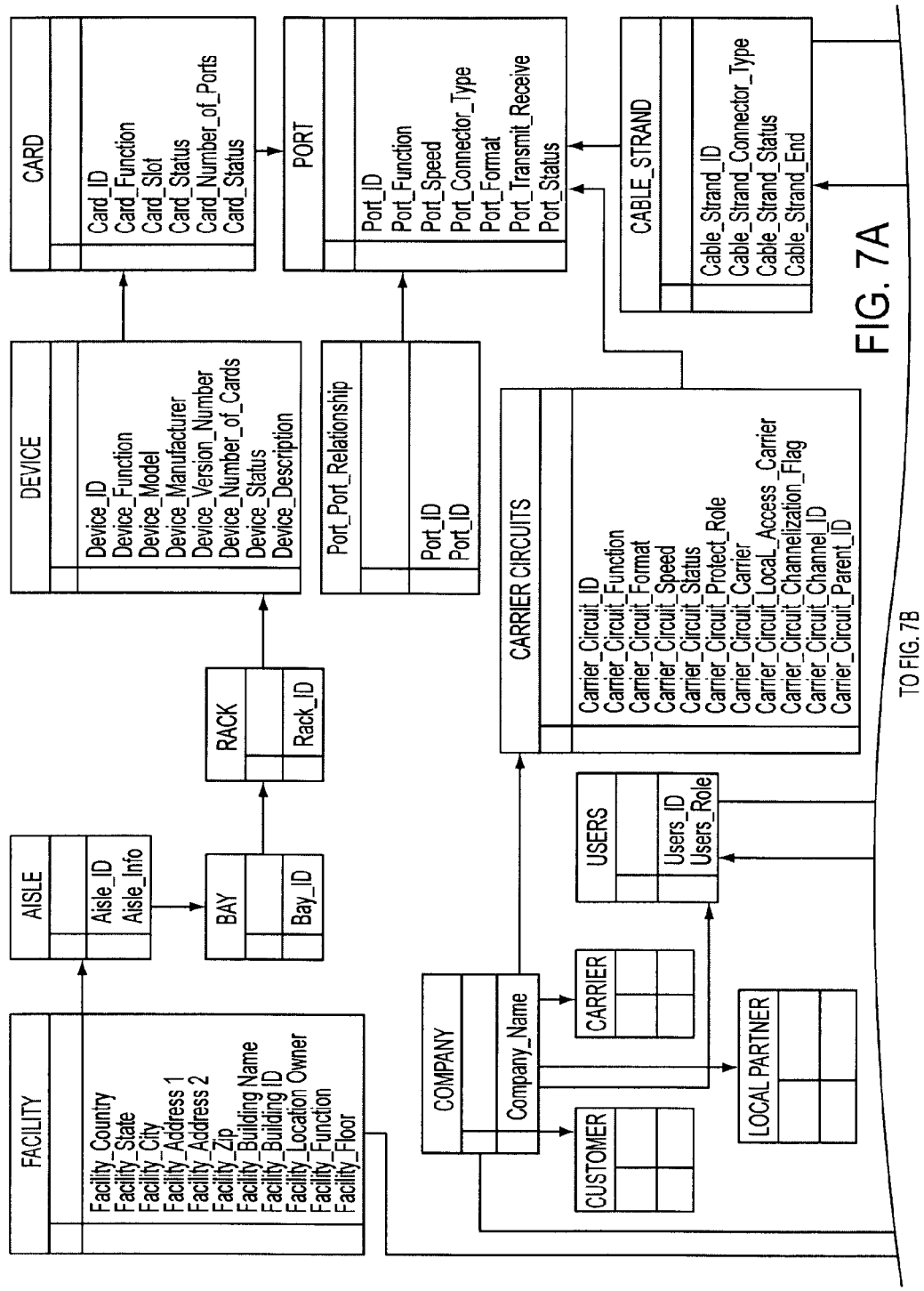
FIG. 7 illustrates an exemplary database structure.
Figure 7B:
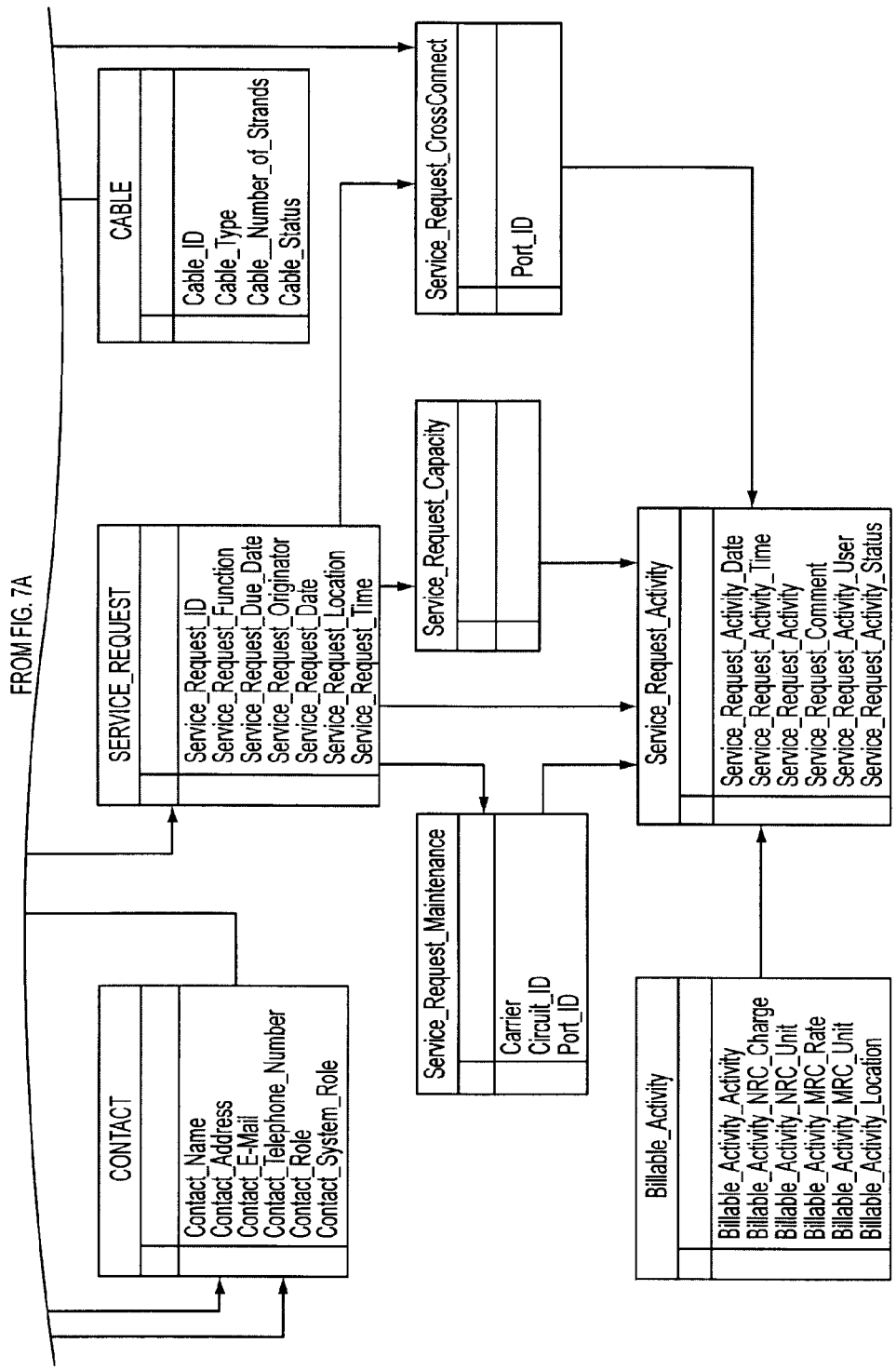

A proposed database structure is shown in FIG. 7. An equivalent object class definition may be specified. To maintain separation of customer data, tables are dedicated to customers.

Other Functional Capabilities

The system provides the following additional user functions and productivity features.

Graphical User Interface
1. The system provides a web based interface for end users and user administrators and supports major browsers including, but not limited to, Microsoft Internet Explorer, Firefox, Netscape, and Opera.
2, The system may provide client based interfaces for system administration functions.

User Functions
1. The user can select values of fields from configurable selection fields. Examples of selection fields are country, city, state, floor, etc. The selection values should be settable by the user administrator.
2. Users can select information associated with people, such as e-mail addresses, telephone numbers, addresses, form an address list
3. Notes—notes/documents can be attached to work activities
4. Work triggers can be available by e-mail and by highlighted items on work screens
5. Users can send e-mails and manage through the system as shown in FIG. 10.
6. Tables shown on work screens and queries can be exported to Excel spreadsheets
7. Users and administrators can create and run customized reports and queries Customization
1. Screens can be customizable for each customer company and each user role. Customization could include: logos, skins, and specific fields displayed on screens.
2. Extensible tables—administrators should be able to add fields to tables and add those fields to specific screens.
3. Letters of Agency and other documents to be e-mailed and attached to Requests and Work Orders can be customized through document templates
4. Billing capabilities—administrator should be able to extract billable activity from the database to send to a rating/billing system.

User Administrative Capabilities

Reports
a. The system can provide an ad-hoc report generator and a statistical report package.
b. The output of the report generator and statistical can be compatible with the spreadsheet applications.
c. Reports can be generated via schedule and on-demand. The schedule can be definable by the application administrator or an authorized user.
2. Field definition—provide capability for field development of new screens and addition of field to tables. Upgrades can be performed while system is in service.
3. Security
   a. The system can allow the user administrator to add/delete/and change users.
   b. The system can allow the user administrator to map users to roles and grant permissions.

System Administration Capabilities
1. Security administration
   a. Provide security administration and partitioning of commands and access to log files, queues, maps, etc. by user, role, customer/organization.
   b. The system can log all transactions and provide Graphical User Interface access to the audit trails.
2. Backup/restoration—provide in service backup & restoration of database and administration information (see backup & recovery).
3. New Releases—provide capability for upgrade of new releases, generics and features with no system downtime.

Technical Requirements

Database
1. The system can provide database with tape or direct disk backup capabilities.
2. The database can be administered by the system administrator through an appropriate GUI
3. The system can provide a database consistent with standard SQL
4. The system can provide the capability for encryption of the database Security
1. Logins and passwords
   a. Login and passwords should be consistent with the use of LDAP or Active Directory
   b. Passwords must pass minimum password requirements of length, characters, and frequency of change.
   c. Only the end user can administer his/her own passwords. Administrators can only reset passwords to default values.
2. Customer users can see data only from their own company and customized screens (logos, skins, etc.) from their own company.

Performance
1. Response time
   a. The system can respond to most user requests within X seconds
   b. If requests are expected to take longer than X seconds, such as database queries or reports, the system provides appropriate wait icons
2. Expected number of users
   a. The system is expected to support Y users within Z months
3. Expected number of records
   a. The system is expected to support up to M records in customer tables.

Examples of Provisioner Tasks Screen

FIG. 8 shows an example screen from which the provisioner maintains a work queue. FIGS. 9A-9B show an example screen for each work order. In this case, the request is for a Cross Connect. FIG. 10 illustrates an example e-mail managed by the system.

Ticketing System

The network access provisioning platform ticketing system provides a true system driven solution that simplifies both the ticket creation and reporting processes. The ticketing system described herein provides a system foundation for enhanced ticket functionality.

The platform supports "Trouble Ticket" type tickets. These are defined as network outages as reported to the network access provisioning platform service provider or customer troubles as reported by DISA and others, and then assigned to the network access provisioning platform service provider. Customers have the ability to directly enter tickets into the ticketing system, as well as provide/request updates via the "work log" functionality provided within the system.

This paragraph describes some of the key features of the Ticketing System. Direct access support and segregated customer access are provided for the network access provisioning platform via a web-based interface. Access permissions are User ID based. Group definitions and user contact information associations are supported for all User IDs. Support is provided for Trouble Ticket entry and updates. Customers can add new tickets and make work log entries. Customer email alerts are sent to indicate when a ticket is opened or updated directly by a customer. Users are allowed to add new contacts and update existing contacts within the system. Order, circuit and contact information are imported automatically into Trouble Tickets from OMS. Improved ticket management includes (1) ticket reason and RFO reason tracking, (2) ticket status tracking, (3) ticket assignment and related interval tracking, (4) related vendor ticket tracking, and (5) TSP restoration priority support. Data management and integrity includes system enforced data entry to support open and closure of tickets. The data driven solution provides enhanced reporting capabilities. The system further provides system support for mean time to repair (MTTR) calculations. Email support is provided for work log entries.

System Access

Access to the ticketing system is provided via a web interface using Internet Explorer. Other browsers can also be used once they are tested with the system. The ticket system functionality is supported within OMS. Once the user navigates to the network access provisioning platform web site, the user will be presented with the OMS login screen, and example of which could be the login screen illustrated in FIG. 11. If a valid User ID and password are entered, the main OMS system screen shown in FIG. 12 could be provided.

Figures 13, 14:
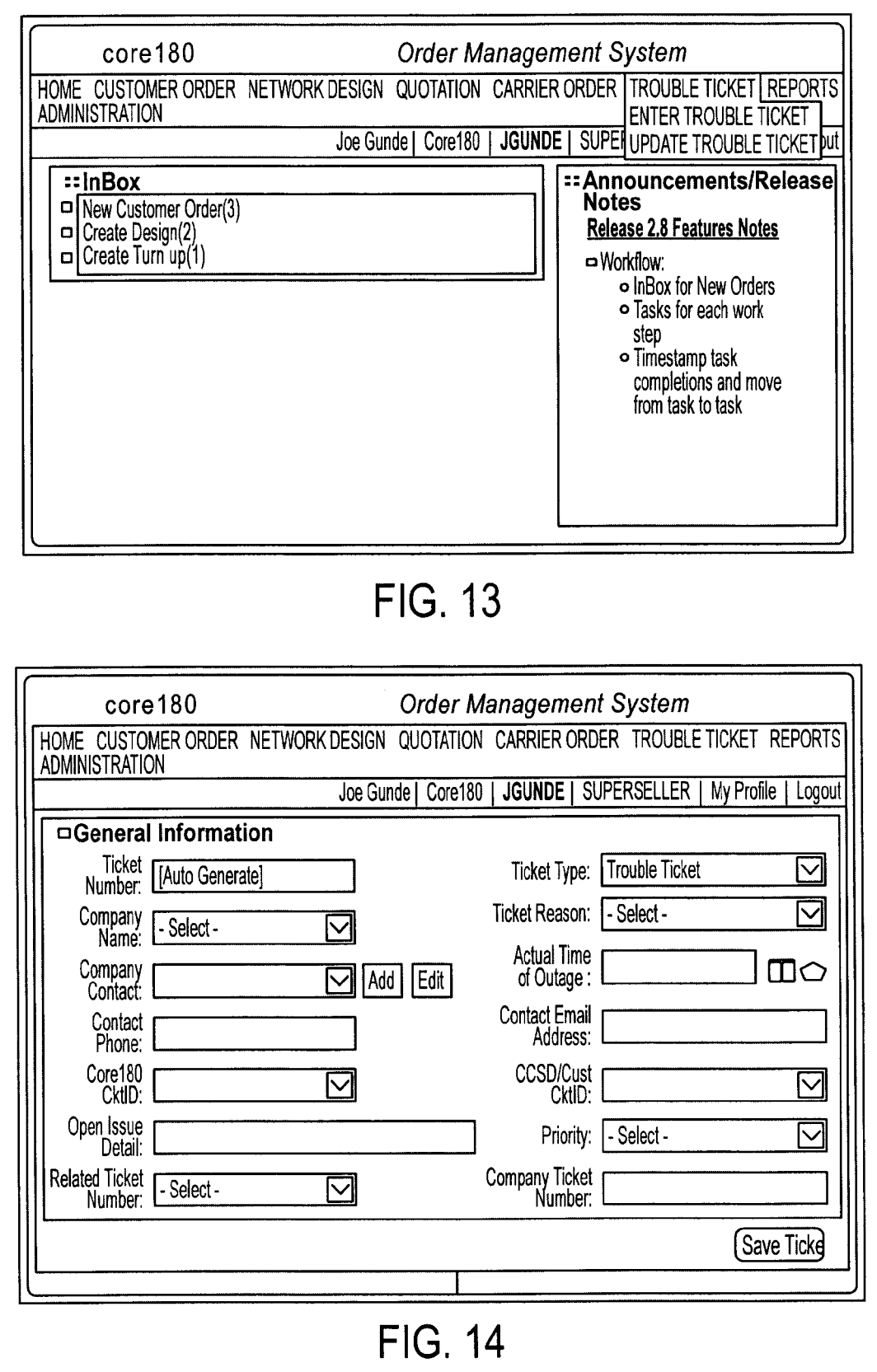

In one embodiment, the Ticket System Access screen is as illustrated in FIG. 13. The trouble ticket drop down list provides the user with two options as shown, i.e., to enter a ticket or to update a ticket. Once a ticket is entered into the system, the remaining activity for that ticket will be performed in the "Update Ticket" area of the ticketing system.

Enter Ticket Screen

In one embodiment, the "Enter Ticket" screen as illustrated in FIG. 14 provides the user with the ability to open a ticket within the Ticketing System. Users must enter all mandatory data and save the ticket. If the data entered is acceptable to the system, a "Ticket Number" is generated and associated with the ticket. Once the ticket is successfully saved, the ticket Status is considered to be "Opened" and can only be accessed via the "Update Ticket" screens. Therefore, the user is pushed by the system into the "Update Ticket" Screen (not shown) for that ticket to gain access to the ticket number that was generated and associated with the new ticket.

The following paragraphs describe the fields within the "Enter Ticket" screen in one embodiment.

The "Ticket Number" is a unique identifier that is generated by the system and associated with the ticket once it has been opened and saved. The "Ticket Number" can include a three character "Ticket Type" and an eight digit number incremented by "Ticket Type."

The "Ticket Type" is the type of the ticket within the system. In one embodiment, this will defaulted to "Trouble Ticket" as the only option. The system can support other ticket types such as Maintenance Ticket (MT). With multiple options available, the ticket type selection will become mandatory and must be entered for all tickets. In addition, "Ticket Type" options will also be determined by user group permissions.

The "Company Name" is the name of the company that either opened or requested the ticket to be opened and is selected from a drop down list. If the ticket is opened by an actual customer via direct access to the system, the system will auto populate this field based on the company associated with the User ID used to gain access to the system. In this case, the Company name will not be allowed to be changed by the user. This is a mandatory field and must be entered for all tickets.

The "Ticket Reason" is a short text reason that indicates why the ticket was opened. The reason is user selectable, but is limited to the options provided within the drop down. The user is required to select the reason that best indicates why the ticket was opened. Any additional detail must be entered into the "Open Issue Detail" field. If the drop down does not provide a reasonable option to select from, a new option can be defined and added to the system by approved personnel. This is a mandatory field and must be entered for all tickets. Table 1 identifies ticket reasons in one embodiment.

TABLE 1

Ticket Reasons

| Item | TO Short Text | Detailed Description |
|---|---|---|
| 1 | ASI Scheduling | |
| 2 | Circuit Degraded | |
| 3 | Circuit Down | |
| 4 | Cust Rcving Loss of Signal | |
| 5 | Cust Rcving Red Alarm | |
| 6 | DS-3 Outage | |
| 7 | | |
| 8 | | |
| 9 | | |
| 10 | | |

The "Company Contact" is the name of the person from the related company that opened or requested the ticket to be opened and is selected from a drop down. If the ticket is opened by an actual customer via direct access to the system, the system will auto populate this field based on the contact information associated with the User ID that was used to gain access to the system. The user will also be allowed to select a different contact associated with that company. If the desired "Company Contact" does not exist within the system, the user will be allowed to add the contact without exiting the "Enter Ticket" process. This is a mandatory field and must be entered for all tickets.

The "Actual Time of Outage" is the date and time, as reported by the customer, when the failure (i.e., reason for ticket) occurred. This is not the date and time the ticket was actually opened. This field can be manually entered by the user when the ticket is opened. This is an optional field and is not required to open a ticket.

The "Contact Phone#" is the business phone number associated with the company contact within the system. This field is auto populated by the system once the company contact is selected. If the contact's business number does not exist within the system, the user will be allowed to edit the contact information within the system without exiting the "Enter Ticket" process.

The "Contact Email Address" is the business email address associated with the company contact within the system. This field is auto populated by the system once the company contact is selected. If the contact's business email address does not exist within the system, the user will be allowed to update the contact information within the system without exiting the "Enter Ticket" process.

The "Core180 CktID" is the network access provisioning platform's unique circuit identification established for all circuits and associated with the related CCSD/Cust CktID within OMS. A user must select either "Core180 CktID" or the "CCSD/Cust CktID" (last 4 characters of the CCSD) and the other will be auto populated by the system. Both are required for circuit related tickets. This is a mandatory field only if the selected company is "DISA."

The "CCSD/Cust CktID" is the customer's internal circuit identification that is associated with a "Core180 CktID" and stored within OMS. For DISA, this is the CCSD. A user must select either the "Core180 CktID" or the "CCSD/Cust CktID" (last 4 characters of the CCSD) and the other will be auto populated by the system. Both are required for circuit related tickets. This is a mandatory field only if the selected company is "DISA."

"Open Issue Detail" is a free form field used to provide an additional ticket reason detail not supported by the short text "Ticket Reason" field. The user may enter any information that is relevant to support the ticket process. This is an optional field and is not required to open a ticket.

"Priority" is the priority of the ticket as determined by the user and is selected from a drop down list. The drop down options are Select, Critical, High, Medium and Low. The priority field defaults to "Select." This is an optional field and is not required to open a ticket.

The "Related Ticket Number" is used to relate an existing ticket to a new ticket within the ticketing system and is selected from a drop down list. The related ticket can be in any status within the system. A user may decide to relate a ticket for any reason. This is an optional field and is not required to open a ticket. However, when tickets are closed, they cannot be reopened after 24 hours. In these cases, a new ticket is required and the related ticket field should be used to refer to the previous ticket.

The "Company Ticket Number" is a free form field used to associate the customer's internal ticket number to the trouble being reported. This is an optional field and is not required to open a ticket.

Figures 15, 16:
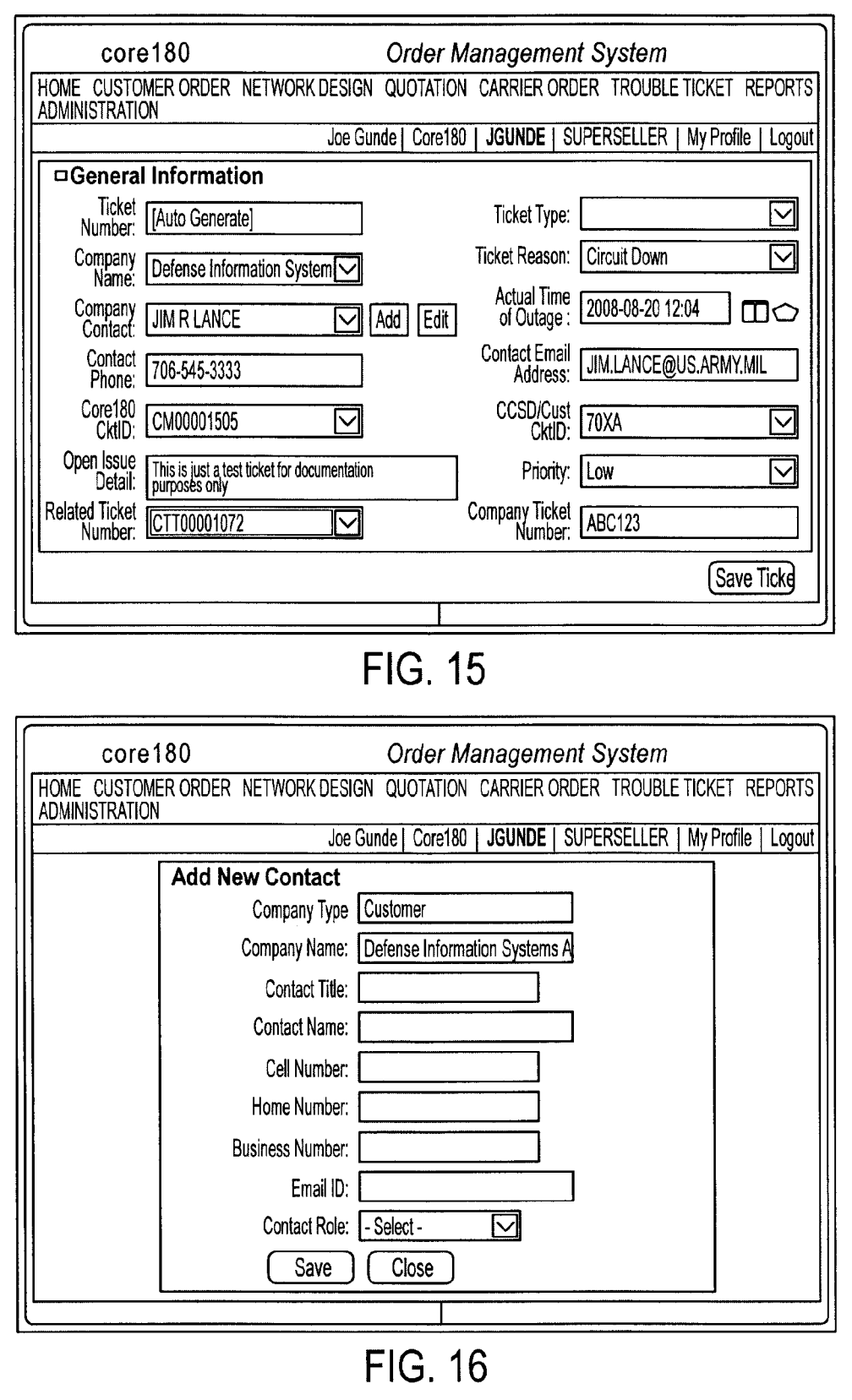
Figure 17:
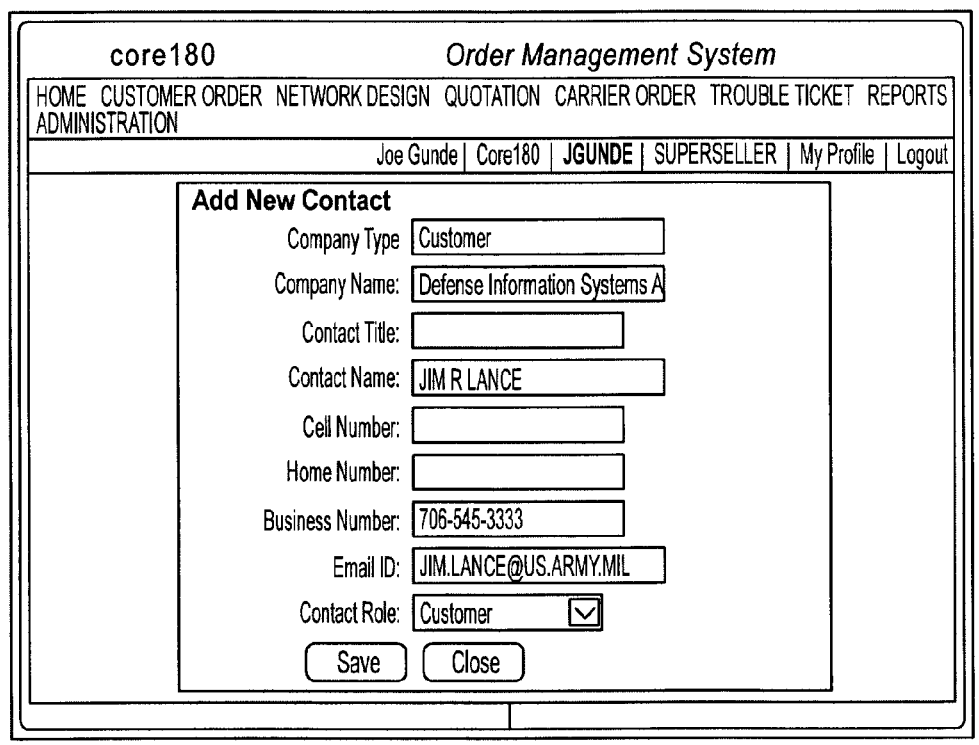
FIG. 17 illustrates an edit contact screen.

FIG. 15 illustrates a sample trouble ticket used in one embodiment. The field entries in the trouble ticket represent a sample ticket prior to saving the ticket. Exemplary add and edit contact information screens are illustrated in FIGS. 16 and 17, respectively. The screens are the same except for the editing (FIG. 17) of existing data (FIG. 16). The field descriptions for the "Contact" screens are described in the following paragraphs.

The "Company Type" is a drop down field used to indicate the company type of the related contact. The current options are Carrier, Customer and Reseller. When accessing the Contact screen via the Enter Ticket screen this field defaults to "Customer."

The "Company Name" is a drop down field used to indicate the company of the related contact. When accessing the Contact screen via the Enter Ticket screen this field will be defaulted to company associated with the ticket.

The "Contact Title" is a free form field used to indicate the job title of the related contact. This is an optional field.

The "Contact Name" is a free form field used to indicate the name of the related contact. This is an optional field.

The "Cell Number" is a free form field used to associate a cell phone number to the related contact. This is an optional field.

The "Home Number" is a free form field used to associate a home phone number with the related contact. This is an optional field.

The "Business Number" is a free form field used to associate a business phone number to the related contact. This is an optional field.

The "Email ID" is a free form field used to associate an email address to the related contact. This is an optional field.

The "Contact Role" is a drop down field used to indicate the role of the related contact. The current options are Carrier Order, Customer, NOC, Quotation and Site. All Vendor contacts for trouble tickets will be entered with a contact role of "NOC." This is an optional field.

Update Ticket Screens

In one embodiment, the "Update Ticket" screens provide the user with the ability to select and update a ticket. Users must enter all mandatory data required to support closing the ticket. The "Update Ticket" screens include two functional areas: one to search for tickets and the other to view and update the ticket detail. The fields that should be included in the "update Ticket' screens are identified in the following paragraphs. Creating these screens are within the capability of one of ordinary skill in the art of display screen layout and are not shown here.

The "Ticket Search" screen provides the user with the ability to search for one or more tickets. Users enter/select the search criteria based on the fields available within the search window. Once entered, users begin the search by selecting a "Search" push button. Once the search results are returned, users can select a specific ticket from the search results by clicking on an icon placed next to the desired ticket. Once selected, the user will be pushed into the "General Information" update screen to view and/or update the selected ticket. Field description are as described below.

The "Ticket Number" is a unique identifier that is generated by the system and associated with the ticket once it has been opened and saved. The "Ticket Number" includes a three character "Ticket Type" and an eight digit number incremented by "Ticket Type."

The "Priority" is the priority of the ticket as determined by the user and is selected from a drop down list. The drop down options are Select, Critical, High, Medium and Low.

The "Company Name" is the name of the company that either opened or requested the ticket to be opened.

The "Most Recent OMS Order #" is the most recent OMS Customer Order related to the Core180/CCSD/Cust CktID that is associated with the ticket.

The "Core180 CktID" is the unique circuit identification established for all circuits and associated with the related CCSD/Cust CktID within OMS.

The "CCSD/Gust CktID" is the customer's internal circuit identification that is associated with the "Core180 CktID" and stored within OMS. For DISA, this is the CCSD.

"Status" is the status of the ticket within the system and is either automatically or manually selected from a drop down list. The drop down options are Canceled, Closed, Opened and Reopened. When a ticket is originally entered and saved, the system will set this field to "Opened." Any future status changes must be selected manually by the user.

The "Ticket Date(s)" is the date when the status was set by the system or user. To and from dates are supported to allow searching for tickets either on a specific date or within a date range.

The "Carrier" is the "Carrier Name" as entered into the related Carrier Order within OMS. The carrier is the vendor from which the circuit was directly ordered. Table 3 contains a list of "vendor values."

TABLE 2

| Vendors (Carriers) | |
| --- | --- |
| Item | Carrier |
| 1 | 360 Networks |
| 2 | Abovenet |
| 3 | Acxiom |
| 4 | AFS |
| 5 | Alltel |
| 6 | American Telesis |
| 7 | Ameritech |
| 8 | AMSouth |
| 9 | Arrowhead Global Solutions |
| 10 | AT&T |
| 11 | Bell South |
| 12 | Broadview |
| 13 | Broadwing |
| 14 | Cavalier |
| 15 | CenturyTel |
| 16 | Cingular |

TABLE 2-continued

| Vendors (Carriers) | |
| --- | --- |
| Item | Carrier |
| 17 | Citizens Comm |
| 18 | Clarity |
| 19 | Core180 |
| 20 | CoreBTS |
| 21 | Cox |
| 22 | FiberLight |
| 23 | FiberTech |
| 24 | Gallatin River |
| 25 | Genuity |
| 26 | Global Crossing |
| 27 | Grande |
| 28 | GRCI |
| 29 | HBC |
| 30 | Hibernia |
| 31 | IFN |
| 32 | iNetworks |
| 33 | Intermedia |
| 34 | ITC Deltacomm |
| 35 | KMC |
| 36 | Knology |
| 37 | Level 3 |
| 38 | Lightcore |
| 39 | MCI |
| 40 | McLeod |
| 41 | Memphis Networx |
| 42 | MFON |
| 43 | Norlight |
| 44 | One Communications |
| 45 | PalmettoNet |
| 46 | Paradigm |
| 47 | PPL |
| 48 | Qwest |
| 49 | RCN |
| 50 | SBC |
| 51 | Sofnet |
| 52 | Southern Light |
| 53 | SouthernLight |
| 54 | Spectra Comm |
| 55 | Splitrock |
| 56 | Sprint |
| 57 | Sun America |
| 58 | TBD |
| 59 | Telix |
| 60 | Time Warner |
| 61 | TWTC |
| 62 | US Signal |
| 63 | Verizon |
| 64 | Westcom |
| 65 | Wiltel |
| 66 | XO |
| 67 | Zayo |
| 68 | |
| 69 | |
| 70 | |
| 71 | |
| 72 | |
| 73 | |
| 74 | |
| 75 | |
| 76 | |
| 77 | |
| 78 | |
| 79 | |
| 80 | |

"Site A" is the Site A location of the Core180/CCSD/Cust CktID that is associated with the ticket as indicated by the OMS Customer Order.

"Site Z" is the Site Z location of the Core180/CCSD/Cust CktID that is associated with the ticket as indicated by the OMS Customer Order.

The "Assigned Group" is the group that is actively assigned and responsible for the ticket within the system and is manually selected from a drop down list. The drop down options are Core180, Customer, and SMC. SMC is the system default for this field. An "Assigned Group" must be defined for all tickets during the lifecycle of the ticket.

The "Assigned Party" is the party that is actively assigned and responsible for the ticket within the system and is manually selected from a drop down list. The drop down options are based on the contacts within the system that are associated with the selected groups (Core180, Customer, and SMC). An "Assigned Party" is not required to be defined. This is due to the shift structures that exist in many SMC/NOC related organizations.

The "TSP Restoration Priority" is the restoration priority as indicated by the last character of the TSP Authorization. This allows the user to select tickets with a TSP restoration priority greater than zero.

Update Ticket Screens

The "Update Ticket" screens provide the user with the ability to view and/or update a ticket. Access to the "Update Ticket" screens is achieved by either saving a new ticket or selecting a ticket within the "Search" screen. In one embodiment, the update ticket screens include three functional areas as described below.

The "General Information" screen (not shown) is the initial screen all users enter from either the "Enter Ticket" screen or the "Search" screen. This screen is used to capture all ticket data generated during the lifecycle of the ticket, except the notes. This screen also contains the most recent entries from the work log(view only).

The "Circuit Detail" screen (not shown) contains read only order and circuit data pulled from OMS for the related circuit.

The "Work Log" screen supports the entry of all notes, issues and free form status information generated during the lifecycle of the ticket.

The "General Information" screen is used to capture all ticket data generated during the lifecycle of the ticket, except the notes. This screen include five functional areas as described below.

The "General Information" section contains all data originally entered to open the ticket, as well as, higher level ticket status information. A history of all status changes and associated dates/times are also maintained within this section.

The "Resolution" section captures all data related to the resolution of the ticket. The majority of the fields within this section must be entered prior to closing the ticket.

The "Ticket Assignments" section tracks all groups and specific parties that were assigned responsibility for the ticket. A history of all group and party assignments and associated dates/times are also maintained in the system.

The "Related Vendor Tickets" section is used to track all vendor related tickets that were opened to support the resolution of the ticket.

The "Work Log Summary" section contains the last two entries from the work log. This is intended to be used as a quick summary of the work being performed on the ticket. If additional details are required that are not provided on the "General Information" screen, the user can search through the remaining notes within the "Work Log."

The following paragraphs identify the fields within the "General Information" section of the "General Information" screen.

The "Ticket Number" is a unique identifier that is generated by the system and associated with the ticket once it has been opened and saved. The "Ticket Number" consists of a three character "Ticket Type" and an eight digit number incremented by "Ticket Type."

The "Ticket Type" is the type of the ticket within the system.

The "Company Name" is the name of the company that either opened or requested the ticket to be opened.

The "Ticket Reason" is a short text reason that indicates why the ticket was opened. The ticket reasons are identified in Table 1 above.

The "Company Contact" is the name of the person from the related company that opened or requested the ticket to be opened and is selected from a drop down list. If the desired "Company Contact" does not exist within the system the user will be allowed to add the contact without exiting the "Update Ticket" process.

The "Actual Time of Outage" is the date and time, as reported by the customer, when the failure (reason for ticket) occurred. This is not the date and time the ticket was actually opened.

The "Contact Phone#" is the business phone number associated with the company contact within the system. If the contact's business number does not exist within the system the user will be allowed to edit the contact information within the system without exiting the "Update Ticket" process.

The "Contact Email Address" is the business email address associated with the company contact within the system. If the contact's business email address does not exist within the system the user will be allowed to update the contact information within the system without exiting the "Update Ticket" process.

The "Core180 CktID" is the unique circuit identification established for all circuits and associated with the related CCSD/Cust CktID within OMS.

The "CCSD/Cust CktID" is the customer's internal circuit identification that is associated with a "Core180 CktID" and stored within OMS. For DISA, this is the CCSD.

"Open Issue Detail" is a free form field used to provide additional ticket reason detail not supported by the short text "Ticket Reason" field.

"Priority" is the priority of the ticket as determined by the user and is selected from a drop down list. The drop down options are Select, Critical, High, Medium and Low.

"Status" is the status of the ticket within the system and is either automatically or manually selected from a drop down list. The drop down options are Canceled, Closed, Opened, and Reopened. When a ticket is originally entered and saved, the system will set this field to "Opened." Any future status changes must be selected manually by the user. A history of all status changes and associated dates/times are also maintained in the system.

The "Related Ticket Number" is used to relate an existing ticket to a new ticket within the ticketing system and is selected from a drop down. The related ticket can be in any status within the system. A user may decide to relate a ticket for any reason. However, when tickets are closed, they cannot be reopened after 24 hours. In these cases, a new ticket is required and the related ticket field should be used to refer to the previous ticket.

The "Company Ticket Number" is a free form field used to associate the customer's internal ticket number with the trouble being reported. This is an optional field and is not required to open a ticket.

"Ticket Status Date/Time" is the date and time of when the status was set by the system or user, as well as, the User ID of the person who either opened or changed the status of the ticket.

"Ticket Escalation" is a checkbox used to indicate that a ticket escalation has occurred on the ticket. All detail related to the escalation must be entered into the work log. This is an optional field.

"Escalation Date/Time" is the date, time and User ID of when and who set the escalation checkbox and is auto populated by the system.

The "Status History" field contains the previous status and related date/time/user information of the ticket. "Status" is the status of the ticket within the system. "Ticket Status Date/Time" is the date and time of when the status was set by the system or user, as well as, the User ID of the person who either opened or changed the status of the ticket.

The following paragraphs identify the fields within the "Resolution" section of the "General Information" screen.

The 'Resolution Time" is the date, time, and user ID of when and who determined that the "Ticket Reason" was resolved. This is set manually by the user. This is a mandatory field and must be entered to close the ticket.

"MTTR" is calculated by the system when the "Resolution Time" field is entered by the user. MTTR is the interval in hours from the time the ticket was opened to the resolution time, minus any time assigned to the company. If the RFO Party is equal to "Customer," the MTTR will be set to zero.

The "RFO Party Type" is the type of party responsible for the cause of the ticket as determined by the user and is selected from a drop down list. The drop down options are Select, Core180, Customer, and Vendor. The field will default to "Select." This is a mandatory field and must be entered to close the ticket.

"RFO Text" is a short text reason used to indicate the cause/resolution of the ticket. This is user selectable, but is limited to the options provided within the drop down list. The user is required to select the reason that best indicates the cause/resolution of the ticket. Any additional detail must be entered into the "RFO Detail" field. If the drop down list does not provide a reasonable option to select from, a new option can be defined and added to the system by approved personnel. This is a mandatory field and must be entered to close the ticket. "RFO" values are shown in Table 3 below.

TABLE 3

Reasons for Outages (RFOs)

| Item | RFO Short Text | Detailed Description |
| --- | --- | --- |
| 1 | Building Maintenance | |
| 2 | Cabling/Wiring failure | |
| 3 | Cleared While Testing . . . Could not Duplicate | |
| 4 | Equipment Disconnected | |
| 5 | Equipment Failure | |
| 6 | Fiber Cut | |
| 7 | Incorrect Configuration | |
| 8 | Incorrect Installation | Used for circuit failures shortly after initial turn-up. |
| 9 | Loss of Crypto | |
| 10 | No Trouble Found | |
| 11 | Power Failure | |
| 12 | Provisioning error | Used after the initial turn-up when Disconnects are incorrectly issued or circuit incorrectly ordered but placed in service |
| 13 | Scheduled Maintenance | |
| 14 | Smartjack | |
| 15 | Software Problem | |
| 16 | Tech Error | |
| 17 | Transport/Parent Ckt Failure | |
| 18 | | |
| 19 | | |
| 20 | | |

The "RFO Resp Party" field is used to identify a specific vendor. This is user selectable, but is limited to the options provided within the drop down list. The user is only required to select a vendor if the "RFO Party Type" is set to "Vendor." If the drop down does not provide the required option to select from, a new vendor can be defined and added to the system by approved personnel. This is a mandatory field if the "RFO Party Type" is set to "Vendor" and must be entered for all tickets of this type to close the ticket.

"RFO Detail" is a free form field used to provide additional RFO detail not supported by the short text "RFO Code/Text" field. The user may enter any information that is relevant to support the ticket process. This is an optional field and is not required to close the ticket.

The following paragraphs provide a description of all fields within the "Ticket Assignment" section of the "General Information" screen.

The "Assigned Group" is the group that is actively assigned and responsible for the ticket within the system and is manually selected from a drop down list. The drop down options are Core180, Customer, and SMC. SMC is the system default for this field. An "Assigned Group" must be defined for all tickets during the lifecycle of the ticket. A history of all group assignments and associated dates/times are also maintained in the system.

The "Assigned Group Date/Time" is the date and time of when the "Assigned Group" was selected by the user, as well as, the User ID of the person who made the assignment.

The "Assigned Party" is the party that is actively assigned and responsible for the ticket within the system and is manually selected from a drop down list. The drop down options are based on the contacts within the system that are associated with the selected groups (Core180, Customer, and SMC). An "Assigned Party" is not required to be defined. This is due to the shift structures that exist in many SMC/NOC related organizations. If the desired party does not exist within the system, the user will be allowed to add the party/contact without exiting the system. The history of all party assignments and associated dates/times are also maintained in the system.

The "Assigned Part Date/Time" is the date and time when the "Assigned Party" was selected by the user, as well as the User ID of the person who made the assignment.

The "Assigned Party Phone#" is the business phone number associated with the "Assigned Party" within the system. This field is auto populated by the system once the "Assigned Party" is selected. If the Assigned Party's business number does not exist within the system the user will be allowed to edit the contact information within the system (Edit push button) without exiting the system.

The "Assigned Party Email" is the business email address associated with the "Assigned Party" within the system. This field is auto populated by the system once the "Assigned Party" is selected. If the Assigned Party's Email address does not exist within the system the user will be allowed to update the contact information within the system without exiting the system.

The "Assigned Group and Party History" contains a history of the previous group and party assignments.

The following paragraphs provide a description of all fields within the "Related Vendor Tickets" section of the "General Information" screen.

The "Vendor Ticket Party" field is used to identify the specific vendor associated with a vendor ticket. This is user selectable, but is limited to the options provided within the drop down list. The drop down values are the same vendors provide in the "RFO Resp Party" field when the "RFO Party Type" is set to "Vendor." If the drop down list does not provide the required option to select from, a new vendor can be defined and added to the system by approved personnel. This is a mandatory field if the "RFO Party Type" is set to "Vendor" and must be entered for all tickets of this type to close the ticket. Many to one vendor tickets are allowed to be entered against a single trouble ticket within the system.

The "Vendor Ticket#" is a free form field used to manually document a vendor ticket number. This is a mandatory field once a "Vendor Ticket Party" has been selected and must be entered to close the ticket.

"Opened" is the date and time when the related vendor ticket was opened. This is manually entered by the user. This is a mandatory field once a "Vendor Ticket Party" has been selected and must be entered to close the ticket.

"Closed" (Resolution Time) is the date and time when the related vendor ticket was resolved. This is manually entered by the user. This is a mandatory field once a "Vendor Ticket Party" has been selected and must be entered to close the ticket. This field captures the date and time of when the resolution occurred, which may or may not be the same time the ticket was closed.

"Vendor Problem" is a checkbox used to indicate that the vendor was at fault in the related ticket.

The "RFO Code/Text" is a short text reason that indicates the cause/resolution of the ticket. This is user selectable, but is limited to the options provided within the drop down. The user is required to select the reason that best indicates the cause/resolution of the ticket. Any additional detail must be entered into the work log. If the drop down list does not provide a reasonable option to select from, a new option can be defined and added to the system by approved personnel. This is a mandatory field once a "Vendor Ticket Party" has been selected and must be entered to close the ticket.

The following provide a description of the fields within the "Work Log" section of the "General Information" screen. The "Notes Date" is the date and time of when the related note/work log entry was made by the user and is auto populated by the system. The "Notes" field is a free form field used to make progress entries associated with the ticket. The user may enter any information that is relevant to support the ticket process from open to closure. The "Notes Added By" field is used to enter the User ID of the person that entered the related notes.

The "Circuit Screen" (not shown) contains read only order and circuit data pulled from OMS for the related circuit. The data provided within this screen originates from two functional areas within OMS—customer orders and carrier orders. OMS order information data provides high level information related to the orders (OMS/TSR), circuit detail, circuit end locations (A/Z), A/Z demarcation and extension information, as well as, A/Z customer contacts. Carrier order information data provides high level information for the each segment associated with the higher level circuit, including the related carrier, carrier circuit ID's, A/Z end locations and channel terminations (DMX assignments, etc.).

The following paragraphs provide a description of all fields within the "Circuit" screen.

The "Most Recent OMS Order #" is the most recent OMS Customer Order related to the Core180/CCSD/Cust CktID that is associated with the ticket.

The "Order Type" is the order type of the most recent OMS Customer Order (New, Disconnect, etc.).

The "NOC Date" is the date the "Notice of Completion" was issued for the related OMS Customer Order.

The "TSR #" is the Telecom Service Request number associated with the related OMS Customer Order.

"Speed" is the speed of the Core180/CCSD/Cust CktID that is associated with the ticket as indicated by the OMS Customer Order (DS1, DS3, etc.).

"Framing" is the framing of the Core180/CCSD/Cust CktID that is associated with the ticket as indicated by the OMS Customer Order (ESF, etc.).

"TSP Auth" is the Telecommunications Service Priority authorization as indicated by the OMS Customer Order.

"Line Coding" is the line coding of the Core180/CCSD/Cust CktID that is associated with the ticket as indicated by the OMS Customer Order (B8ZS, etc.).

The "TSP Restoration Priority" is the restoration priority as indicated by the last character of the TSP Authorization. The following text will also be available to the users from a TSP push button. "Vendors will dispatch outside normal business hours if necessary to restore TSP services assigned a restoration priority of 1, 2, or 3. Vendors are required to dispatch personnel outside normal business hours to restore TSP services assigned 4 or 5 only when the next business day is more than 24 hours away. TSP services will be restored in order of restoration priority level, As a matter of general practice, service vendors should restore existing TSP services before provisioning new TSP services."

"Site A" is the Site A location of the Core180/CCSD/Cust CktID that is associated with the ticket as indicated by the OMS Customer Order.

"Site Z" is the Site Z location of the Core180/CCSD/Cust CktID that is associated with the ticket as indicated by the OMS Customer Order.

"Customer Demarc A & Z" is the Site A and Z Customer Demarc information as indicated by the OMS Customer Order.

"Carrier Demarc A & Z" is the Site A and Z Carrier Demarc information as indicated by the OMS Customer Order.

"Extension Info A & Z" is the Site A and Z Extension information as indicated by the OMS Customer Order.

"Contacts A & Z" is the Site A and Z Primary and Secondary Contacts as indicated by the OMS Customer Order.

The following paragraphs provide a detailed description of all Carrier order related fields within the "Circuit" screen.

The "Routing Information" is the segment detail for each segment associated with the Core180/CCSD/Cust CktID that is related to the ticket. The following is provided from OMS for each segment:

"Segment Number" is the segment number associated with the Core180/CCSD/Cust CktID (1, 2, etc.).

"Label" is the "Facility Label" field as entered into the related Carrier Order within OMS.

"Channel" is the "Carrier Order for Channel" as entered into the related Carrier Order within OMS. Typically this is the slot used within the parent circuit that is used for CFA/Interconnection.

"Circuit ID" is the "Carrier Circuit ID" as entered into the related Carrier Order within OMS. Typically this is the primary vendor circuit ID for the segment (i.e., the vendor which received the issued carrier order.

"Company" is the "Carrier Name" as entered into the related Carrier Order within OMS.

"Site A" is the "Site A" as entered into the related Carrier Order within OMS. In most cases, this is the A end of the parent circuit as defined in OMS.

"Site Z" is the "Site Z" as entered into the related Carrier Order within OMS. In most cases, this is the Z end of the parent circuit as defined in OMS.

"LEC ID A" is the "LEC ID A" as entered into the related Carrier Order within OMS.

"LEC ID Z" is the "LEC ID Z" as entered into the related Carrier Order within OMS.

"Chan Term A" is the "Channel Termination A" as entered into the related Carrier Order within OMS. In most cases if provided, this is the DMX cross connect information associated with the channel used within the parent circuit for CFA/Interconnection.

"Chan Term Z" is the "Channel Termination Z" as entered into the related Carrier Order within OMS. In most cases if provided, this is the DMX cross connect information associated with the channel used within the parent circuit for CFA/Interconnection.

"Carrier Trouble Reporting Contacts" is the trouble reporting contact information for each segment based on the vendor associated with each segment.

The "Work Log" screen supports the entry of all notes, issues and free form status information generated during the lifecycle of the ticket. The "Work Log" screen has two functional areas—general information and notes. The general information section provides read only ticket data for the convenience of the users. The selected data provides reference information (related ticket, company, and circuit information) for the user when viewing or updating entries in the work log. The notes section allows the users to enter free form text to describe all issues, progress, testing results, discussions, etc., that are generated during the lifecycle of the ticket. Users are allowed to restrict customer access to selected notes, as well as, email selected notes.

The following paragraphs provide a detailed description of all fields within the "Work Log" screen.

The "Ticket Number" is a unique identifier that is generated by the system and associated with the ticket once it has been opened and saved. The "Ticket Number" contains a three character "Ticket Type" and an eight digit number incremented by "Ticket Type."

The "Company Name" is the name of the company that either opened or requested the ticket to be opened.

"Related Ticket Number" is used to relate an existing ticket to a new ticket within the ticketing system. The related ticket can be in any status (opened, closed, etc.) within the system. A user may decide to relate a ticket for any reason. However, when tickets are closed, they cannot be reopened after 24 hours. In these cases, a new ticket is required and the related ticket field should be used to refer to the previous ticket.

"Company Contact" is the name of the person from the related company that opened or requested the ticket to be opened. If the ticket is opened by an actual customer via direct access to the system, the system will auto populate this field based on the contact information associated with the User ID used to gain access to the system. The user will also be allowed to select a different contact associated with that company.

"Contact Phone#" is the business phone number associated with the company contact within the system.

"Contact Email Address" is the business email address associated with the company contact within the system.

"Core180 CktID" is the unique circuit identification established for all circuits and associated with the related CCSD/Cust CktID within OMS.

"CCSD/Cust CktID" is the customer's internal circuit identification that is associated with a Core180 CktID and stored within OMS. For DISA, this is the CCSD.

"Status" is the status of the ticket within the system and is either automatically or manually selected from a drop down list. The drop down options are Canceled, Closed, Opened, and Reopened.

"Ticket Status Date/Time" is the date and time of when the status was set by the system or user, as well as, the User ID of the person who either opened or changed the status of the ticket.

The following paragraphs provide a description of the fields within the "Notes" section of the "Work Log" screen.

"Notes Date" is the date and time when the related note/work log entry was made by the user and is auto populated by the system.

"Notes" is a free form field used to make progress entries associated with the ticket. The user may enter any information they feel is relevant to support the ticket process from open to closure.

"Notes Added By" is the User ID of the person that entered the related notes.

The "Send Email" checkbox provides the user with the ability to select one or more notes to send via email. Once selected, an "Email Selected Notes" push button is then used to email the notes.

The "Customer Viewable" checkbox is used to indicate which notes are viewable to customers accessing the system. The default for all notes will be set to viewable. The field itself will not be viewable to any customers accessing the system.

The embodiments of the invention have been described as computer-implemented processes. It is important to note, however, that those skilled in the art will appreciate that the mechanisms of the disclosed embodiments are capable of being distributed as program products in a variety of forms, regardless of the particular type of tangible signal bearing media utilized to carry out the distribution. Examples of signal bearing media include, without limitation, recordable-type media such as diskettes, CD ROMs, flash drives, memory cards, etc.

The corresponding structures, materials, acts, and equivalents of any means plus function elements in any of the claims below are intended to include any structure, material, or acts for performing the function in combination with other claim elements as specifically claimed.

Those skilled in the art will appreciate that many modifications to the exemplary embodiments are possible without departing from the scope of the invention. In addition, it is possible to use some of the features of the embodiments described without the corresponding use of the other features. Accordingly, the foregoing description of the exemplary embodiments is provided for the purpose of illustrating the principles of the invention and not in limitation thereof since the scope of the invention is defined solely by the appended claims.

What is claimed is:

1. A backbone server network of a network service provider, comprising:
a plurality of backbone servers, the plurality of backbone servers coupled to a first interconnect point with a first carrier network provided by a first carrier and a second interconnect point with a second carrier network provided by a second carrier, the first carrier network and the second carrier network each including a plurality of carrier servers; and
a controller communicably coupled to the plurality of backbone servers, the controller configured to
receive a request to establish a connection between a start point and an end point, the start and end points being included in one or more of: the first carrier network, the second carrier network, and the plurality of backbone servers,
analyze a plurality of circuits between the start point and the end point, and
select one of the plurality of circuits based on the analysis, the selected one of the plurality of circuits including at least one of the plurality of backbone servers and at least one carrier server from the first carrier network or the second carrier network.

2. The network of claim 1, further comprising:
a configuration database that includes a plurality of metrics for each of the first carrier network and the second carrier network, the plurality of metrics describing the first and second carrier networks.

3. The network of claim 2, wherein the plurality of metrics includes one or more of: pricing information, a speed, and a bandwidth.

4. The network of claim 1, wherein the request to establish a connection includes one or more parameters for specifying the connection.

5. The network of claim 4, wherein the one or more parameters include a price or performance value.

6. The network of claim 4, wherein said analyze a plurality of circuits further includes a determination of whether the one or more parameters have been fulfilled.

7. The network of claim 1, wherein said analyze a plurality of circuits further includes an analysis of the price associated with each of the plurality of circuits.

8. The network of claim 1, wherein the controller is further configured to:
generate a request to the first carrier or the second carrier to provide service to establish the selected one of the plurality of circuits.

9. The network of claim 1, further comprising a work order ticketing system configured to:
receive a work order request related to the connection; and
automatically generate a work order to manage the work order request.

10. The network of claim 9, wherein the work order ticketing system automatically tracks a progress of the work order.

11. The network of claim 9, wherein the work order request includes the request to establish the connection.

12. A computer-implemented method of providing a network service connection between a start point and an end point, the method comprising:
receiving a request, at a controller, to establish a connection between the start point and the end point, the start and end points being included in one or more of a first carrier network, a second carrier network, and a plurality of backbone servers, wherein the plurality of backbone servers are coupled to the first carrier network and the second carrier network, and communicably coupled to the controller;
analyzing, at the controller, a plurality of circuits between the start point and the end point; and
selecting, at the controller, one of the plurality of circuits based on the analysis, the selected one of the plurality of circuits including at least one of the plurality of backbone servers and at least one carrier server from the first carrier network or the second carrier network.

13. The method of claim 12, further comprising:
retrieving, from a configuration database, a plurality of metrics for each of the first carrier network and the second carrier network, wherein the plurality of metrics describes the first and second carrier networks.

14. The method of claim 13, wherein the plurality of metrics includes one or more of: pricing information, a speed, and a bandwidth.

15. The method of claim 12, wherein the request to establish a connection includes one or more parameters for specifying the connection.

16. The method of claim 15, wherein the one or more parameters include a price or performance value.

17. The method of claim 15, wherein said analyzing a plurality of circuits further includes a determination of whether the one or more parameters have been fulfilled.

18. The method of claim 12, wherein said analyzing a plurality of circuits further includes analyzing the price associated with each of the plurality of circuits.

19. The method of claim 12, further comprising:
generating a request to the first carrier or the second carrier to provide service to establish the selected one of the plurality of circuits.

20. The method of claim 12, further comprising:
receiving, by a work order ticketing system, a work order request related to the connection; and
automatically generating a work order to manage the work order request.

* * * * *